(12) United States Patent
Harvey et al.

(10) Patent No.: US 6,280,361 B1
(45) Date of Patent: Aug. 28, 2001

(54) COMPUTERIZED EXERCISE SYSTEM AND METHOD

(75) Inventors: William B. Harvey, Olney; Leonard S. Haynes, Rockville; Benjamin Bachrach, Bethesda, all of MD (US)

(73) Assignee: Intelligent Automation, Inc., Rockville, MD (US)

( * ) Notice: Subject to any disclaimer, the term of this patent is extended or adjusted under 35 U.S.C. 154(b) by 0 days.

(21) Appl. No.: 09/497,109

(22) Filed: Feb. 3, 2001

(51) Int. Cl.[7] .................................................. A63B 23/04
(52) U.S. Cl. ....................... 482/8; 482/4; 482/9; 482/101
(58) Field of Search ................... 482/4–9, 101, 482/135–138, 94, 97–100, 133, 148, 121; 601/23, 5, 33–35

(56) References Cited

U.S. PATENT DOCUMENTS 5,827,154 * 10/1998 Gill ........................................... 482/9
6,050,920 * 4/2000 Ehrenfried ............................... 482/6
6,120,423 * 9/2000 Mackey et al. ....................... 482/121

* cited by examiner

Primary Examiner—Glenn E. Richman

(57) ABSTRACT

The present invention provides a computerized exercise system and method allowing exercising in both a gravity field and a gravity free environment. The exercise system includes one or more exercise modules positioned at specific locations and coupled to an exercise member through an extendable cable extending between each exercise module and one or more exercise members. A controlling structure controls tension forces in each of the cables for generating desired resistive forces in the exercise member at each point of its trajectory, simultaneously moving through a trajectory, defined by exercise parameters. When a user performs an exercise routine, he/she moves the exercise member and overcomes the resistive forces elevated by the exercise modules through the controlled tension forces in each cable.

22 Claims, 24 Drawing Sheets

COMPUTERIZED EXERCISE SYSTEM AND METHOD

FIELD OF THE INVENTION

The present invention relates to a computer controlled electromechanical exercise system, and more particularly, to a portable lightweight, and easily reconfigured exercise system for use on earth with normal gravity and in a gravity free environment, i.e., in a spacecraft application.

Even further, the present invention relates to a computer controlled exercise system developed to support isometric, isokinetic, and isotonic exercise modes of operation and easily reconfigured for flexibly providing a multitude of exercising options to the user to support complex, multi-axis exercise trajectories involving up to 6 degrees of freedom motion.

Further, the present invention relates to an exercise system comprising one or more active portable exercise modules serving to generate forces otherwise not existing in a gravity-free environment. The system includes associated control electronics, and an overall operational exercise program.

The present invention further relates to an exercise system serving as an exercise dynamometer in that the exercise forces applied by a user against the exercise system are monitored and recorded for subsequent evaluation.

Additionally, the present invention relates to an exercise system provided with means to tune the particular exercise or level of effort to the physical condition of a user in real time and allows the user to perform a wide range of exercises, both cardiovascular and resistive which are customized to the user's needs.

Even further, the present invention is directed to an exercise system providing the user with both local or remote programming capability, including centralized supervision, i.e., networking of exercise machines, and networked competition, i.e., the interconnection of exercise machines in a desired configuration, in order that geographically displaced users may compete against each other.

The exercise system of the present invention even further relates to a virtual reality exercise machine to increase the motivation and enjoyment of the user to perform exercises.

PRIOR ART

Conventional exercise machines typically operate by taking advantage of earth's gravitational field to generate a force against which a user must perform a given motion or exercise. To remove the dependency of the exercise machine on the gravitational field, various resistive exercise devices and systems have been developed, and described in, for example, U.S. Pat. Nos. 4,174,832; 4,253,663; and, 5,486,149, which are directed to resistive exercise devices incorporating a pulley or reel mounted flexible cord. In each device, a user performs exercise by displacing, or extending, the stored cable against a resistive force. These Patents fail, however, to teach a flexible control system whereby either complex or even simple exercise trajectories can be either preprogrammed or controlled.

A three-axis passive motion microprocessor controlled exerciser, described in U.S. Pat. No. 5,211,161, is adapted to move the patient's foot in dorsal-planar, valgus-varus and abduction-adduction modes. A microprocessor monitors the motions of the structural elements in the exerciser and controls both the position and torque of three motors responsible for various motions in the three-axes in synchronization with each other. The bulky apparatus described in the U.S. Pat. No. 5,211,161 imparts a plurality of nominal displacements to the patient's foot for therapeutic purposes, and thus, the device is limited to its special designed purpose, and cannot be considered nor adaptable as a flexible, all-purpose exercise device and dynamometer.

U.S. Pat. No. 5,577,981 is directed to a computer controlled virtual reality exercise machine. For operation, the device requires a plurality of heavy motor actuated booms, a treadmill, and a specially adapted booth. These substantial structural requirements prevent use of this system in any application requiring portable, low weight, and easily reconfigured exercise equipment. Disadvantageously, the boom actuating motors, pulleys, and associated electronics are unnecessarily complicated; and the boom actuated handles, against which the user exerts exercise forces, are limited in their range and complexity of motion.

U.S. Pat. No. 4,934,694 is directed to a computer-controlled exercise system for optimizing the exercise of skeletal muscles under program control which requires a substantive stationary structure to support its operation which limits applications of the exercise system in an environment requiring portability, low weight of the system and flexibility. Further, the exercise system fails to provide a user with the capability of complex exercise trajectories.

In summary, these prior exercise systems fail to provide the flexibility, wide range of exercise trajectories, ease of reconfigurability, portability, programmability and simplicity needed in space and other applications.

SUMMARY OF THE INVENTION

It is therefore an object of the present invention to provide a lightweight, portable, flexible and easily reconfigurable computerized exercise system capable of providing a multitude of exercising options to a user adapted for use in a gravity environment as well as in gravity free environments.

It is another object of the present invention to provide an exercise system comprising one or more portable active exercise modules, associated control electronics, and an overall operational control architecture for controlling and coordination of the combination of the exercise modules to support complex, multi-axis exercise trajectories involving up to 6 degrees of freedom motion.

It is a further object of the present invention to provide a computerized exercise system capable of being tuned to the physical condition of a user in real time.

It is still a further object of the present invention to provide a computerized exercise system capable of being networked with geographically displaced exercise machines for centralized supervision thereof from a centralized location to allow a network competition between geographically displaced users.

It is yet a further object of the present invention to provide a computerized exercise system which serves as an exercise dynamometer in which the exercise forces applied by a user against the exercise system are monitored and recorded for subsequent evaluation.

It is still another object of the present invention to provide a computerized exercise system including one or more active portable exercise modules which allow for simulating resistive forces against which a user exercises is easily repositionable for reconfiguration of the overall system, where each exercise module incorporates a gear drive reduction system mated to a motor additionally functioning as an electromagnetic brake in passive use.

In accordance with the teachings of the present invention, a computerized exercise system comprises one or more compact active resistive exercise modules, control electronics associated therewith, and an operational control architecture that provides overall control of the exercise system.

Each exercise module is secured to a reference base at a predetermined location. The exercise module includes a displaceable cable extending therefrom and coupled to one or more exercise members (manipulandum) which a user of the exercise system moves during the performance of an exercising routine. Each exercise module further includes a rotatable reel mounted therewithin for reversibly winding the displaceable cable thereon. A tension actuating unit (such as a DC brushless motor mated with Harmonic Drive unit) mounted within the exercise module housing controls the rotatable reel to generate a required tension force in the cable and to displace the cable a required distance. The exercise module is provided with a displacement sensing unit for monitoring in real time the displacement of the cable, and further is provided with a force sensing unit operating in real time to monitor the tension forces in the cable.

By generating required tensions in the cables coupled to the manipulandum, virtual resistive forces are created which are applied to the manipulandum in order that the user of the exercise system feels a resistance to his/her forces on the manipulandum during performing the exercise routine.

The control electronics for the exercise system of the present invention includes a processor controller and memory for storing therein a plurality of exercise options, presented by predetermined sets of the manipulandum positions and resistive forces associated with these positions. There is further included means for generating a control signal for controlling the tension actuating unit within each active exercise module coupled to the manipulandum which creates a required tension force in each cable and the displacement thereof.

As the user applies forces to displace the manipulandum along an exercise trajectory, the processor control means monitors the existing tension in the cable and existing displacement of the displaceable cable extending from each exercise module by means of the displacement sensing unit and the force sensing unit. Responsive to these quantities, and in cooperation with a predetermined set of data representative of position of the manipulandum and the required resistive force parameters to be simulated at the manipulandum, the processor control means provides a control signal to each exercise module for controlling the rotatable reel to produce a required tension force in the cable, or the required position of the manipulandum for each motion degree of freedom (depending on the particular exercise being performed).

It is an essential feature that the exercise system of the present invention may be "tuned" to a particular user. For this reason, information concerning the particular user, for example, height, weight, dimensions, age, and certain exercise restriction parameters, etc., are entered into the processor control means, and in accordance with this information, the predetermined exercise configuration data set is adjusted.

Although the exercise system of the present invention may be fully functioning with only one active exercise module, it is contemplated that a plurality of the active exercise modules are used and controlled by the processor control means to interact each with the other in a unique manner to simulate virtual weight of the manipulandum in order to create the real feeling of the user that he/she is performing exercise routines in a gravitational field, or with actual weights.

Each exercise module includes a module housing, preferably spherical, a rotatable reel mounted within the module housing for reversibly winding the cable extending therefrom, an electric motor controlled by the processor control means and a Harmonic Drive™, planetary gear drive, or similar gear system disposed between the electric motor and the rotatable reel, which uniquely providing a required reduction ratio in the range of 60:1 to 100:1 (in one embodiment, the gear ratio can be manually switchable). The electric motor along with the reduction system are adapted for rotating the rotatable reel selectively in a forward and a reverse direction so that the reel can unwind and upwind the cable thereon thereby creating a required tension force in the cable.

The processor control means includes an input unit for entering a plurality of predetermined exercise option data sets, and module configurations which can be entered either manually or from a location remote from the processor control means through a communication link, for instance, a digital network.

A configuration logic unit is coupled to the output of the input unit, which serves for verifying whether a desired exercise configuration is executable and corresponds to safety requirements for each particular user. If the safety requirements are met, the data corresponding to the selected exercise configuration data set (including data about the required forces and exercise trajectory) are fed into the memory means which additionally includes a library of simulated resistive force equations as functions of the manipulandum positions with reference to the reference base.

A tension planner block is coupled to the memory means to receive the force equations and other exercise data such as exercise trajectory therefrom and to translate the resistive forces to be generated at the manipulandum into tension forces and/or cable displacement to be created in the cables for each degree of freedom for each exercise configuration. An optimization routine block is coupled to the tension planner block to receive a set of parameters representative of the required tension forces in the cables and to find an optimal set of these tension forces. The optimal set of the tension forces is then fed back to the tension planner block.

A repetition logic/look-up table/interpolator unit is coupled to the tension planner block to control initiation, operation, and conclusion of a selected exercise routine. A dynamic controller is coupled to the repetition logic/look-up table/interpolator unit to receive data representative of desired tension forces in the cables and further is functionally coupled to the force sensing units in each active module to receive data representative of the actual tension force in each cable. The dynamic controller constantly compares the actual tension forces received from the force sensing units and the required tensions in the cables, then based on the comparison, controls the electric motor within each active exercise module to displace the respective cable in a proper combination of one or more requirements, including required direction through a required distance, at a required velocity, or yielding a specific force to generate the desired exercise conditions.

A length-to-position conversion unit is coupled to the tension actuating unit which includes the electric motor, the gear reduction unit, and rotatable reel, to receive data representative of the length of the cable attached to the manipulandum, and further is coupled to the repetition logic/look-up table/interpolator unit to transmit thereto data representative of position of the manipulandum.

These and other novel features and advantages of this invention will be fully understood from the following detailed description of the accompanying Drawings.

DESCRIPTION OF THE PREFERRED EMBODIMENTS

Figure 1A:
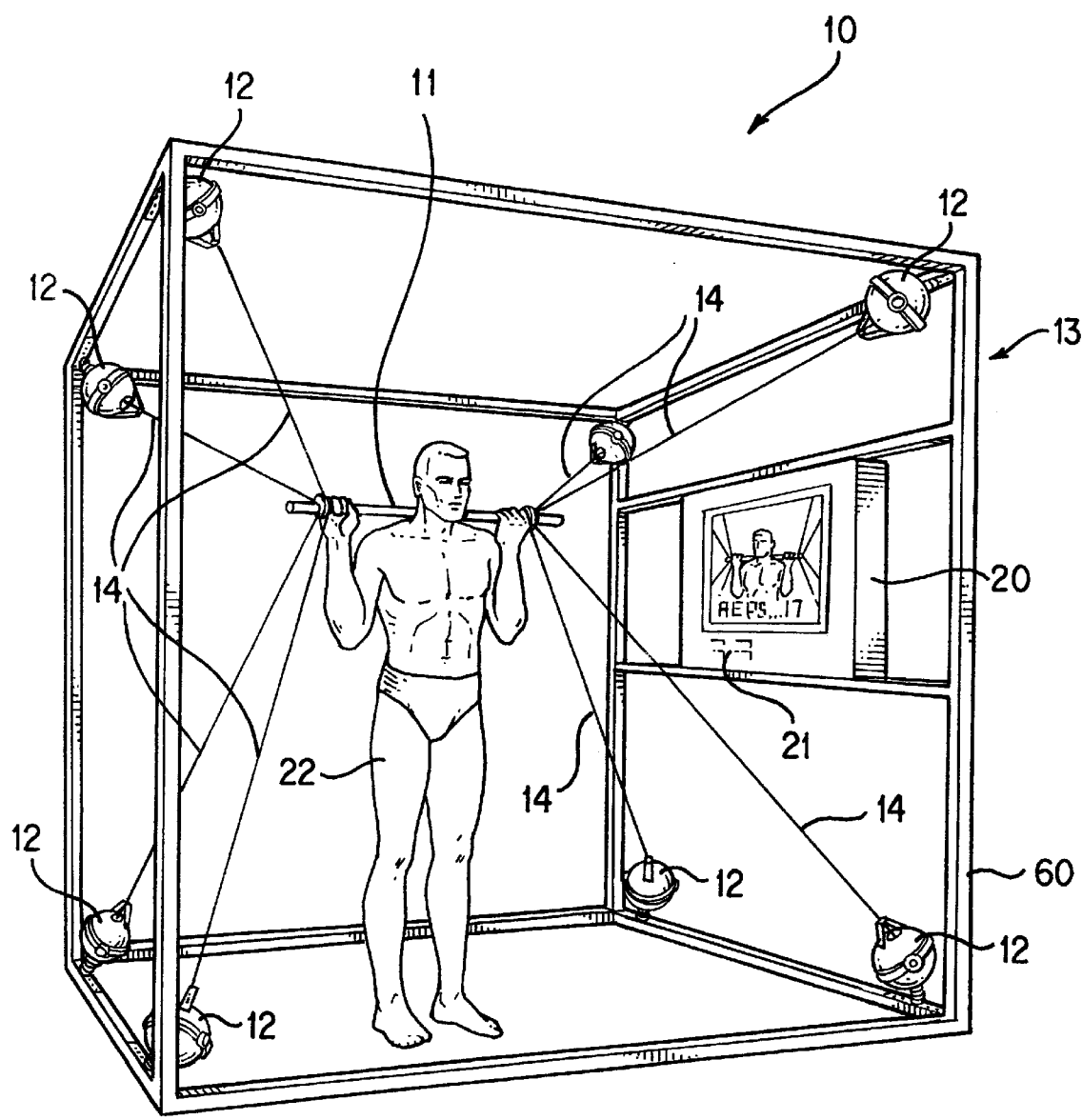
FIGS. 1A–1J show perspective views of the computerized exercise system of the present invention adapted for performing different exercise routines.
Figure 1B:
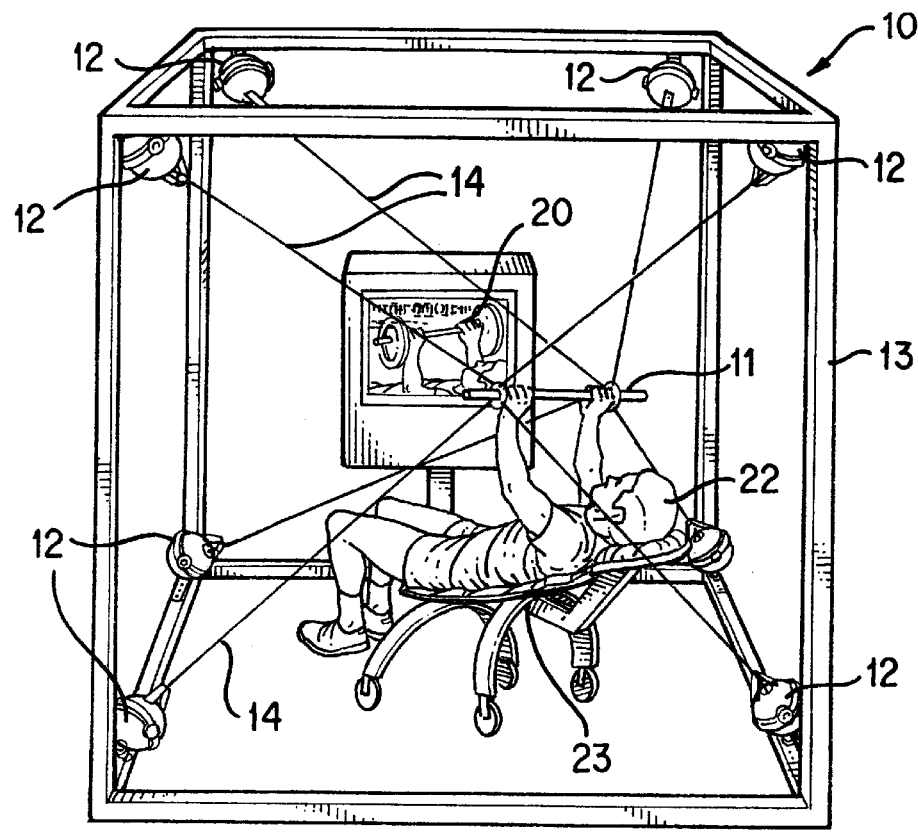

Referring to FIGS. 1A and 1B, a computerized exercise system of the present invention, also referred to as multi-purpose multi-axial isokinetic dynamometer (MMID) 10, includes an exercise member, also referred to as manipulandum 11, a plurality of exercise modules 12, a frame structure 13, and a plurality of cables, or cords, 14 extending from a respective exercise module 12 and coupled to the manipulandum 11.

Each exercise module 12 is flexibly coupled to the reference base, i.e., the framing structure 13, at a predetermined position. In the particular configuration of the exercise system 10, shown in FIGS. 1A and 1B, these predetermined coupling positions correspond to the inner eight corners of the parallelepiped defined by the framing structure 13.

It is understood by those skilled in the art that other particular configurations of the exercise system 10 of the present invention, as well as a different number of exercise modules 12 may be used and predetermined coupling positions may differ from those shown in FIGS. 1A and 1B.

In the implementation of the exercise system 10 of the present invention it is not necessary that the specific framing structure 13 is used for coupling the exercise modules thereto. For example, the exercise module 12 can be removably attached to a floor, to walls, or to the ceiling in a gym or at home at predetermined locations thereon providing the gym has an attachment fixture pre-installed therein.

Figure 1C:
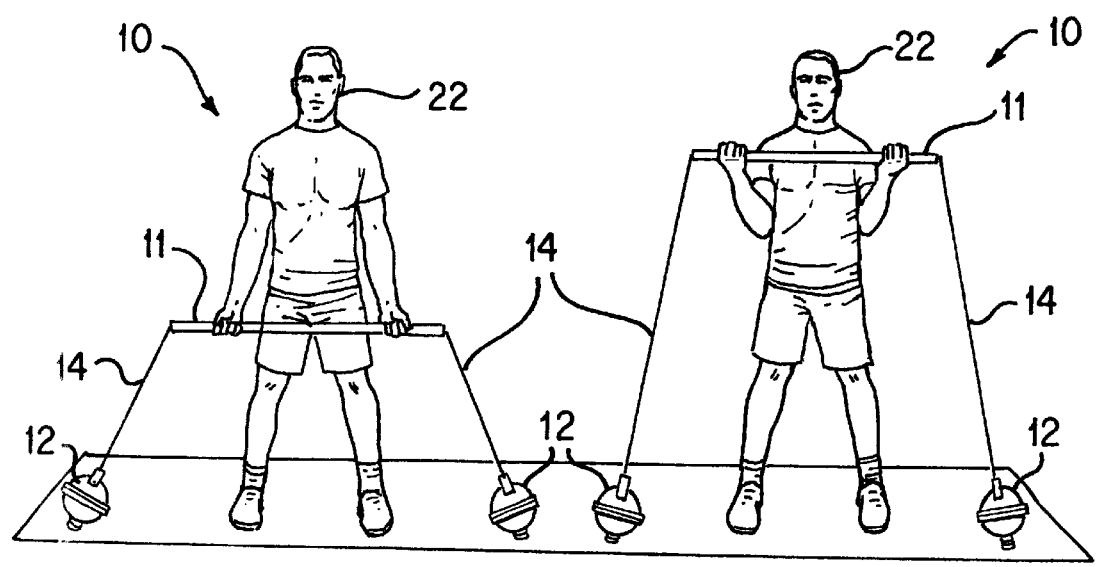

For performing different exercise routines, a different number of exercise modules are needed. For example, for performing "curls", only two exercise modules 12 need be attached to the bottom beam of the framing structure 13 or to the floor with a cable 14 extending from each exercise module 12 to the bar-like manipulandum 11, as shown in FIG. 1C.

Figure 1D:
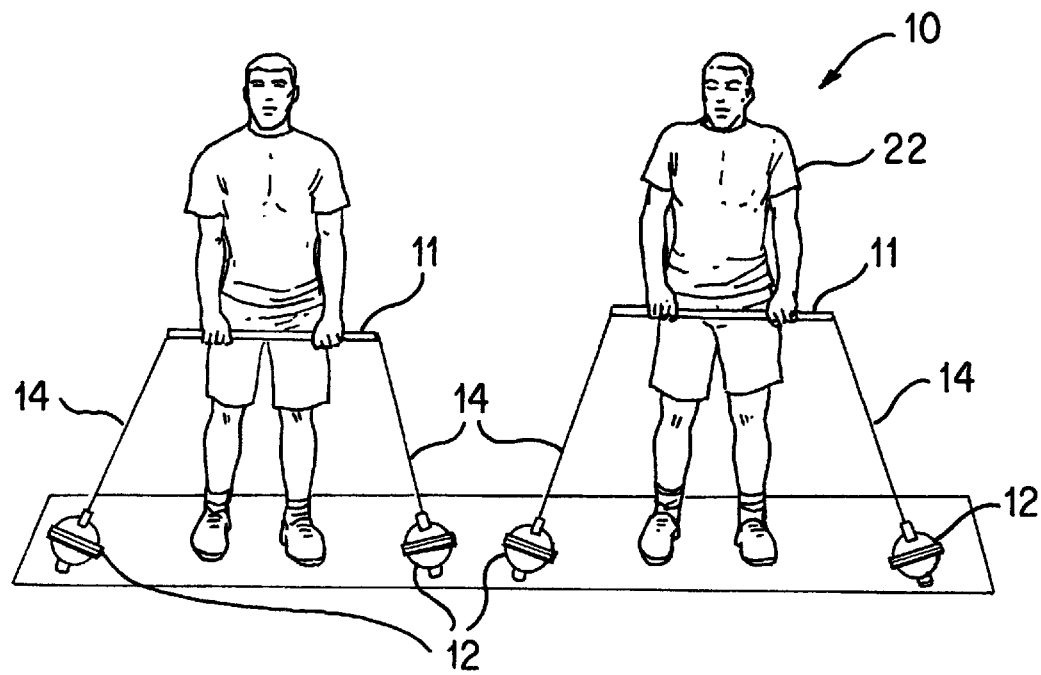
Figure 1E:
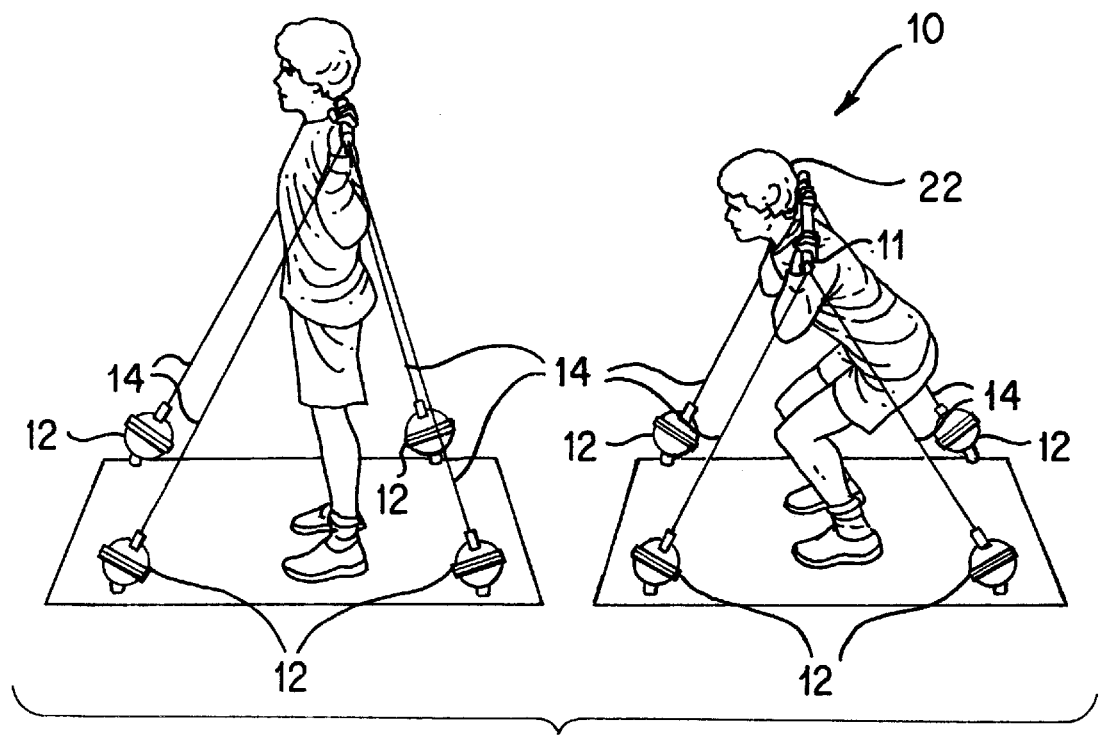

For performing "squats", four exercise modules 12 are attached to the floor or to the framing structure 13, as shown in FIG. 1E. Similar to "curls", the "shoulder shrugs" shown in FIG. 1D require only two exercise modules 12 with two cables 14 connected to the end of the bar-like manipulandum 11.

Figure 1F:
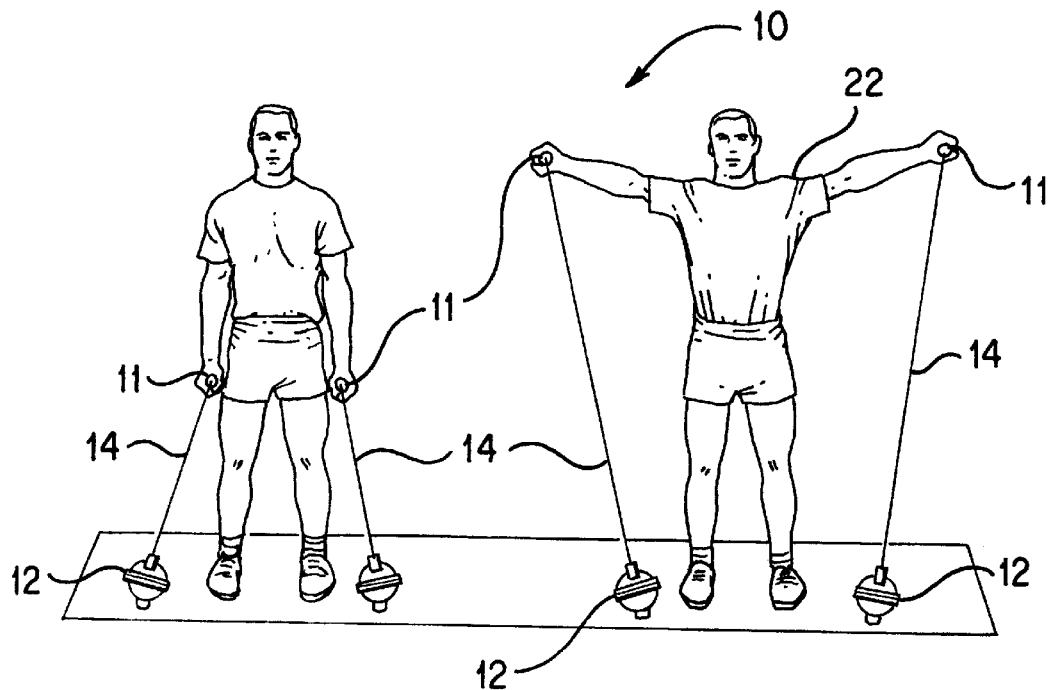
Figure 1G:
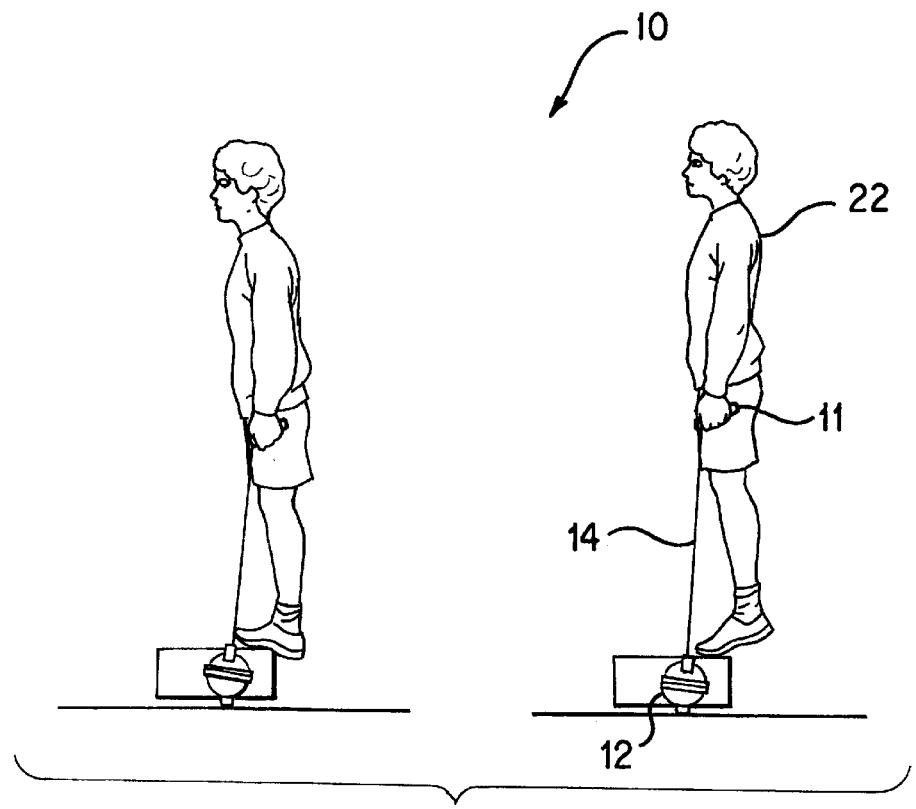

In the performance of "side lateral raises" and "standing heel raises", as shown in FIGS. 1F and 1G, two exercise modules 12 are attached to the floor or the framing structure and a pair of manipulandums 11 are used with the cables 14 extending between each exercise module 12 and the respective manipulandum 11.

Figure 1H:
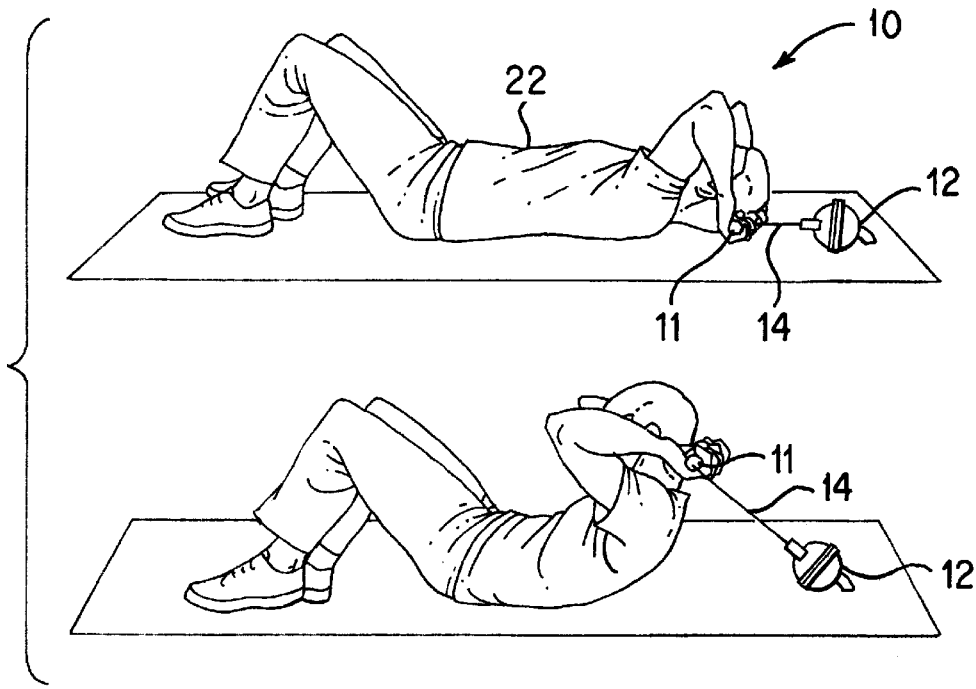
Figure 1I:
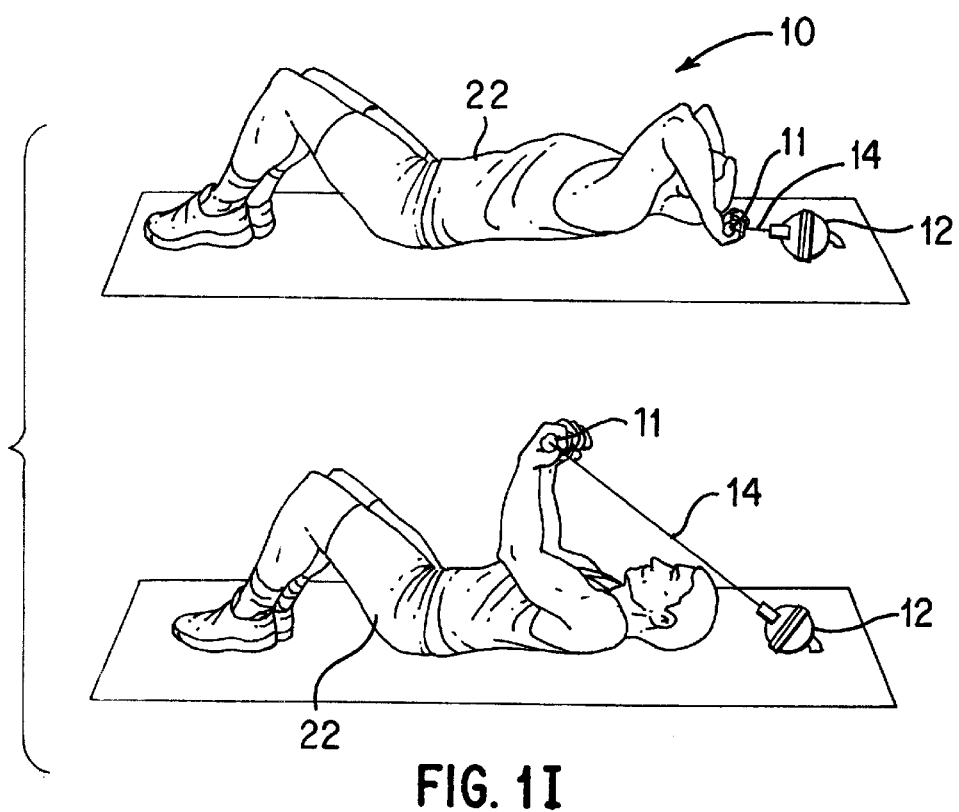

For performance of "sit-ups" and "triceps", only one exercise module 12 is attached to the attachment fixture on the floor or to the framing structure 13, with the cable 14 extending from the exercise module 12 to the center of the manipulandum 11, as shown in FIGS. 1H and 1I.

Figure 1J:
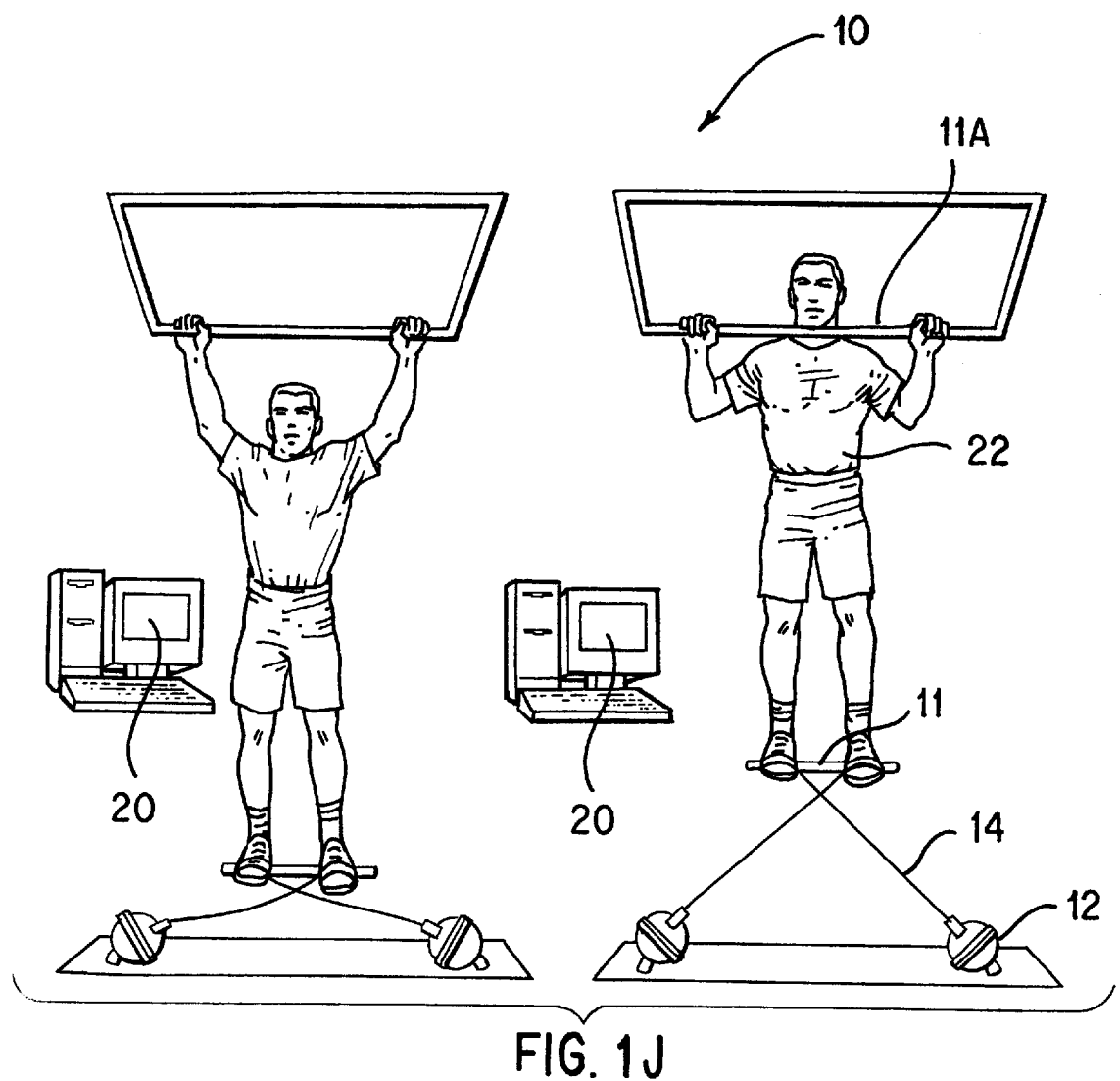

In order to perform "pull-ups", as shown in FIG. 1J, two exercise modules 12 are attached to the framing structure 13 or to the floor with two cables 14 coupled to the manipulandum 11 having specific crossing positional arrangements therebetween. An upper bar shown in FIG. 15 may be optionally fixedly attached to the ceiling in the gym, or home, or may be arranged as a second manipulandum 11A, similar to the manipulandum 11, attached by two cables 14 to two exercise modules 12 and controlled by the exercise system 10.

It is an important feature of the present invention that the active modules 12 be easily repositionable i.e., removable and installable, so that the exercise system may be quickly reconfigured if desired for performing different exercises, provided that the attachment fixtures are pre-installed in an area adapted for exercise activities.

As discussed in previous paragraphs, each of the exercise modules 12 has extending therefrom a respective extensible and retractable, displaceable cable (or cord) 14. Displaced ends of the cables 14 are coupled to the manipulandum 11 by means known to those skilled in the art, for instance, by loop-and-hook coupling best shown in FIG. 2. In order to accomplish this purpose, the manipulandum 11 is furnished with two end members 15 which serve as handles and attachment fixture for the cables 14. Each end member 15 is provided with a latching hook 16 which engages with loops 17 on displaced ends 18 of each cable 14 so that the displaced ends 18 of four cables 14 are coupled to one end member 15 of the manipulandum 11 while the displaced ends 18 of the other four cables 14 are coupled to an opposing second end member 15 of the manipulandum 11 to thereby suspend the manipulandum 11 within the interior space defined by the framing structure 13 as shown in FIGS. 1A and 1B.

As will be described more thoroughly in further paragraphs, the exercise system 10 of the present invention further includes a control structure 19 for monitoring and controlling one or a plurality of exercise modules 12 in synchronized coordination each with respect to the other in order to simulate gravity or otherwise generate forces or move through a predefined trajectory in the area of exercising. The control structure 19 includes a display 20 electrically coupled to an input device 21, and control electronics for monitoring and controlling the exercise system 10. A variety of electronic signals are communicated between each of the plurality of the exercise modules 12 and the control structure 19. Each exercise module 12 is adapted to transmit signals indicative of sensed tension and displacements of the cables 14 to the control structure 19, and then responsive thereto, the control structure 19 is able to independently control each exercise module 12 in accordance with an overall exercise control program.

Although completely applicable for use in different relevant fields, (such as physical therapy) the exercise system of the present invention is envisioned optimally for use in gravity free environments, i.e., in space. In the present invention, any dependency of the exercise system 10 on the gravitational field is overcome and in combination with complete automation allows the following unique possibilities:

(a) exercising in the absence of a gravitational field,
(b) creation of exercises which would be extremely difficult, or impossible, to implement by conventional exercise machines, as for example creating complex exercise trajectories,
(c) "tuning" the particular exercise or level of effort to the physical condition of the user in real time,
(d) networking of exercise system 10 to allow configuring a set of geographically displaced exercises from a centralized location,
(e) interconnection of exercise systems 10 in a planned configuration to allow two or more geographically distant users to compete in "pushing" against each other,
(f) use for passive motion therapy in a physical therapy application.

To use the exercise system 10, the user 22 grasps the manipulandum 11, which is suspended by the extended ends 18 of the cables 14 within the framing structure 13, and performs a set of exercise movements by exerting forces on the manipulandum 11. The forces applied by the user to the manipulandum 11 are to overcome the resistive forces created by the controlled tensions of the cables 14 simulating the behavior of the manipulandum in the gravitational field. The exercise system 10 responds to the forces and/or exercise trajectories specified for the manipulandum 11 by the user 22 in a manner to be described more fully in later paragraphs. Basically, the exercise system 10 of the present invention can support complex multi-axis exercise trajectories involving up to six degree of freedom motion.

Figure 3:
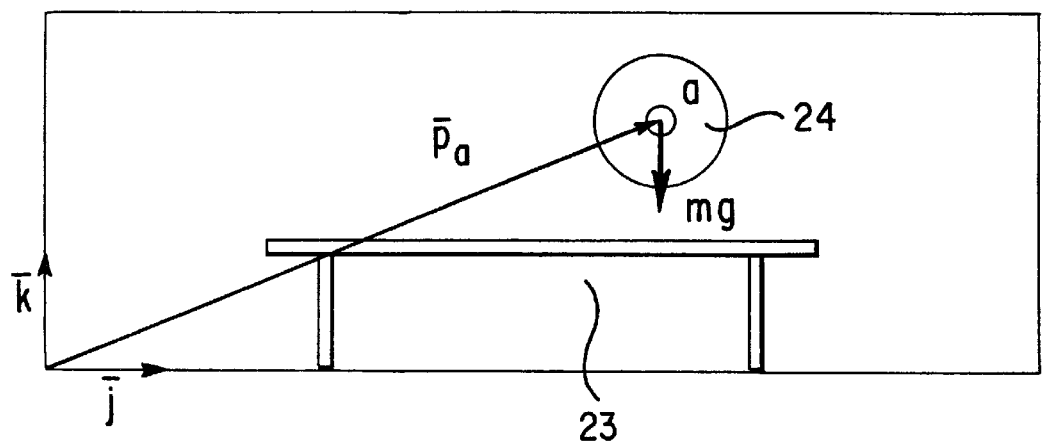
FIG. 3 is a side view of a bench press exercise set-up in the gravitational field.
Figure 4:
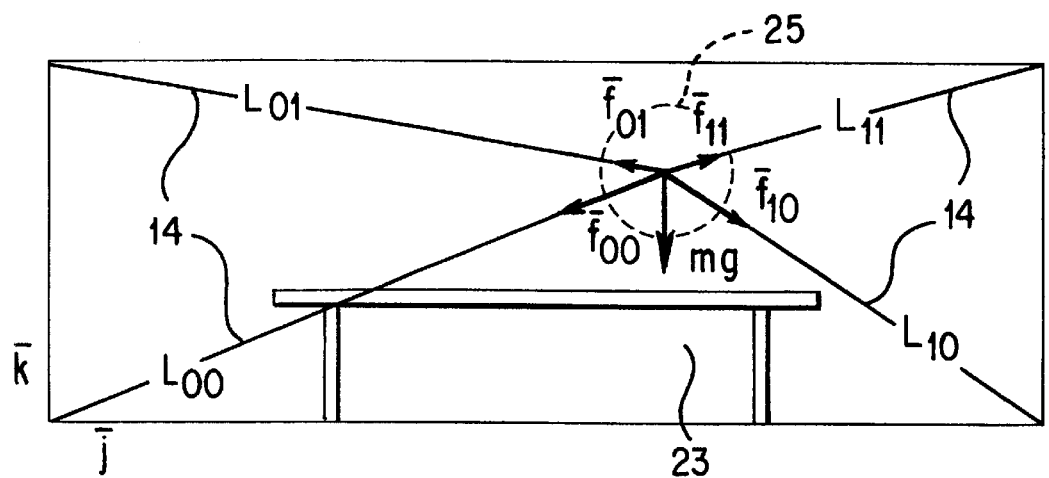
FIG. 4 is a schematic view of the bench press set-up of the exercise system of the present invention showing simulation of the effect of gravity on a virtual mass, i.e., the manipulandum.

Operational principles of the exercise system of the present invention will be better understood in view of FIGS. 3 and 4. Although, as discussed in previous paragraphs, a wide range of exercise routines can be simulated and performed in the exercise system 10 of the present invention, the operational principles of a "bench press" exercise to be simulated are chosen to be described herein not for introducing any limitations, but merely as one of a plurality of examples.

The "bench press" is an exercise where the user lays on an exercise bench 23, as shown in FIG. 1B, and lifts a bar-like manipulandum 11 with two weights attached at opposing ends. In a gravitational field, as shown in FIG. 3, the concentric circles 24 represent the weight which is being pulled downward by the earth's gravitational field. The magnitude of the force exerted by the gravitational field is given by F=mg, where m is the mass of the weight a, and g is the gravitational constant. We have limited our discussion to a two dimensional (2D) implementation in order to avoid cumbersome notation. The position of the mass in the 2D systems is denoted by $\bar{p}_a$. In the case of a free, unconstrained weight, the force produced by the gravitational field acting on mass a, can be described in the following fashion:

$$\bar{F} = -mg\bar{k} \quad (1)$$

where the vectors $\bar{j}$ and $\bar{k}$ are shown in FIG. 3.

As shown in FIG. 4, in order to simulate the effect of gravity on a "virtual mass", the forces $\bar{f}_{00}, \bar{f}_{01}, \bar{f}_{10}, \bar{f}_{11}$ exerted by the cables 14 ($L_{00}, L_{01}, L_{10}, L_{11}$) must satisfy:

$$\bar{f}_{00}(\bar{p}_a) + \bar{f}_{01}(\bar{p}_a) + \bar{f}_{11}(\bar{p}_a) = \bar{F}(\bar{p}_a) = -mg\bar{k} - m\ddot{\bar{p}}_a \quad (2)$$

for all positions $\bar{p}_a$. The term $-m\ddot{\bar{p}}_a$ on the right hand side of the equation (2) is used to simulate the effect of inertia. Inertia becomes significant only if the acceleration of the motion is relatively large. Although for the sake of simplicity, in this discussion, the effect of inertia is ignored, this does not imply that this effect is not included in the later version of the exercise system 10 of the present invention.

Since the cables 14 can only exert tension forces, the forces $\bar{f}_{00}, \bar{f}_{01}, \bar{f}_{10}$, and $\bar{f}_{11}$ are specified as:

$$\bar{f}_{ij} = \bar{f}_{ij} \frac{(\bar{X}_{ij}^0 - \bar{p}_a)}{\|(\bar{X}_{ij}^0 - \bar{p}_a)\|} \quad (3)$$

where $\bar{x}^0_{ij}$ is the position at which the cable $L_{ij}$ is anchored in the 2D framing structure 13. The principles of the 3D structure of the exercise system 10 of the present invention is described in following paragraphs.

In this manner, the user 22 feels the effect of virtual weight shown as a circle 25 in FIG. 4. Equation (2) is not trivial to satisfy due to the fact that changes in the geometry of the cables 14 imply that the required forces $\bar{f}_{00}, \bar{f}_{01}, \bar{f}_{10}, \bar{f}_{11}$ change with the position of the virtual weight ($\bar{p}_a$). In other words, even for a simple bench press exercise where a constant force is being generated, the tension of the cables 14 must be continuously adjusted as the position of the virtual weight changes. Thus, in order to create the desired effect of a virtual weight, the exercise system 10 will require a careful "tension planner" to insure that condition (equation 2) is satisfied. Further, for bench press exercises, the motion of the manipulandum can be constrained to only vertical motion, creating virtual rails. Therefore, in addition to creating the desired vertical force, the system must resist all horizontal forces or torques. In these non-vertical directions of motion, the force vector generated will be equal and opposite to those forces generated by the user, and the motion allowed will be only vertical.

Figure 5:
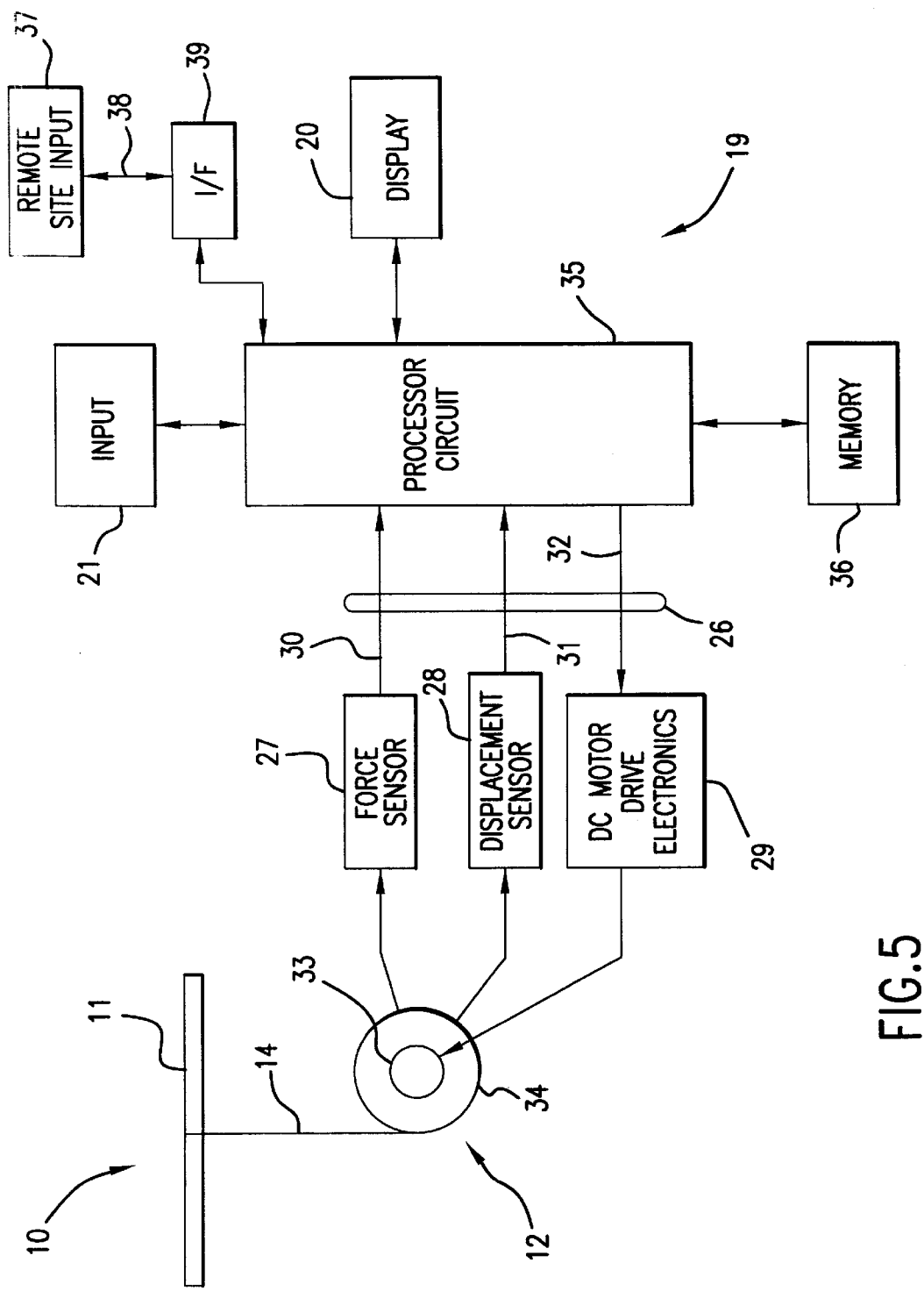
FIG. 5 is a block diagram showing the major functional components of the control electronics of the exercise system of the present invention.

Turning now to the specific structural and electronic detail of the present invention, the control electronics of the exercise system 10 is represented in FIG. 5, wherein one exercise module 12 is schematically illustrated coupled to the control structure 19 through signal communication link or cabling 26. Each exercise module 12 has a force sensor 27, a displacement sensor 28 and DC motor drive electronics 29. Displacement sensor 28 can be a rotary encoder physically connected to the motor to sense the rotation of the motor. In the preferred embodiment, the signals from Hall effect sensors integral to the motor are used to measure motor rotation. This saves the cost of separate encoders, reduces cabling, and simplifies the mechanical design of the exercise modules. As a result, the mechanical diagrams explained later in this disclosure do not show a distinct encoder as part of the exercise module configuration. The resolution of the Hall effect sensor method is less than that of a separate rotary encoder, but in the MMID, the resulting resolution is still more than adequate. The force sensor 27 continuously senses the tension force exerted in the extended cable 14 and provides the control structure 19 with a first signal 30 indicative of the sensed tension force in the cable 14.

Similarly, the displacement sensor 28 continuously senses the length of the cable 14 extending from the exercise module 12 and more particularly, the length of the cable extending between the exercise module 12 and manipulandum 11 and then provides the control structure 19 with a second signal 31 indicative of this extended cable length.

The control structure 19 generates a feedback control signal 32 which is input to the DC motor drive electronics 29 of the exercise module 12, which in turn provides drive current control to a DC motor 33 in the exercise module 12. The motor 33 through a rotational reel 34 within the exercise module 12 controls the tension and/or displacement of the cable 14.

The control structure 19 includes a processor circuit 35 coupled with memory 36, the display device 20, and the input device 21. The display device 20, such as a computer monitor or similar display device, best shown in FIGS. 1A and 1B, provides to the user a variety of graphic and textual visual displays relating to the status of the exercise system. The input device 21 may be a keyboard, mouse device, touch screen, touch panel device, any other known computer type input device, or even a combination of the foregoing. Through the input device 21, the user 22 enters various exercise parameters required for controlling the exercise system of the present invention into the processor 35 and memory 36 of the control structure 19. Obviously, previously stored exercise values can be recalled by name, rather than re-entering the data.

Alternatively, the user 22 may enter these various parameters into the control structure 19 from a remote site input device 37 or recall previously stored values by name. Such remotely entered parameters are transmitted from the remote site input device 37 over a communication link 38 to an interface 39 such as a modem for input to processor 35 and its associated memory 36. Communication link 38 may include, but is not limited to, radio, wire, or telephone links, and can encompass digital computer networks such as the Internet.

Although only the singular exercise module 12 is illustrated in FIG. 5, it is likely that in any given exercise system configuration of the present invention, a plurality of exercise modules 12 may be employed as is shown for example in FIGS. 1A–1G and FIG. 1J. In these plural configurations, each exercise module 12 provides to the control structure 19 first and second signals 30 and 31 indicative respectively of tension force exerted and the extended length of its associated cable 14. Further, the control structure 19 provides an independent control signal 32 to each of the plurality of the exercise modules 12. In this manner, the control structure 19 independently controls the forces applied by each exercise module 12, on associated reel 34 and the cable 14 extending therefrom to achieve a desired force or displacement for each degree of freedom of motion.

To perform a particular resistive exercise, the eight exercise modules 12 are flexibly secured to the respective base surfaces of the framing structure 13 in predetermined positions as shown in FIGS. 1A and 1B, using their respective coupling mechanisms 40, more fully discussed in following paragraphs. The user 22 grasps, or attaches the manipulandum 11 to a limb. The user exerts a force upon manipulandum 11 to displace, or attempt to displace the same along any given exercise trajectory in accordance with a selected exercise routine against controlled resistive forces applied by the plurality of exercise modules 12 through their cables 14. As the user displaces the manipulandum 11 (and correspondingly the respective end 18 of the cable 14 coupled thereto) along the trajectory, the exercise modules 12 continually provide to the computer of the control structure 19, both the cable tension force signals 30 and the cable extension signals 31. Responsive to these signals, and to the exercise configuration parameters entered by the user into the control structure 19 through the input device 21 (or prestored in the memory 36) the control structure 19 generates and provides to each of the exercise modules 12 a respective control signal 32 to adjust the tension force in a respective cable 14 so that at each position of the manipulandum, forces are generated which simulate a gravitational field or which generate any desired force or trajectory corresponding to the exercise configuration parameters of the preselected exercise routine.

As shown in FIG. 5, the control structure 19 controls all of the initialization and operational aspects of the exercise system 10 of the present invention. In the control structure 19, the processor 35 executes software control programs to effect this initialization and overall operation control of the system. The various high level program control modules and the various user interactions required to render the exercise system of the present invention operable is described in following paragraphs.

The user must initially configure the exercise system of the present invention before he or she can perform exercises therewith. Thus, the user must establish the positional configuration for the exercise module 12 by attaching the same to the various attachment positions within the base framing structure 13, or alternatively, floors, ceilings and walls in gyms or at home as described above. After the user has positioned the various exercise modules 12, he/she can then invoke the initialization/configuration software of the exercise system using an input device 21 and the display 20.

Figure 6:
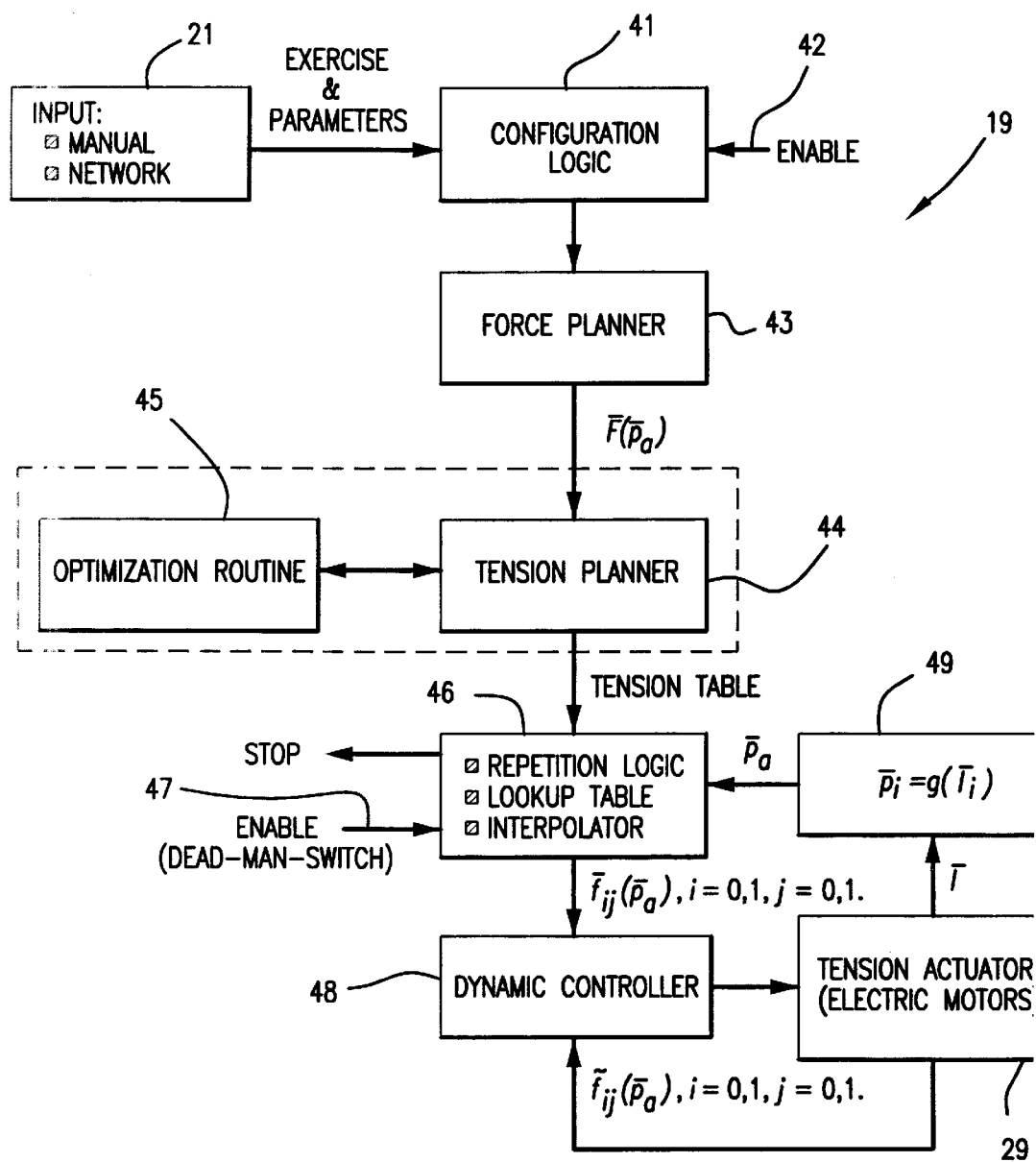
FIG. 6 is a schematic view of the control flow for the exercise system of the present invention.

As shown in FIG. 6, the input to the exercise system 10 is entered into the input device 21 manually or can be downloaded from a network such as the Internet. The input to the control structure 19 may include parameters representative of the desired exercise together with any parameters required to specify the desired behavior of the system. Examples of such parameters include, but are not limited to: desired (virtual) weight, number of repetitions, exercise trajectory, etc. A Configuration Logic block 41 is coupled to the output of the input device 21 to receive exercise and system parameters and decides whether to allow the desired exercise and the desired behavior of the system. The Configuration Logic block 41 is included in the control structure 19 for safety reasons, in order that no motion or command is performed without complete confidence that the desired specification is executable and safe for this particular user. The Configuration Logic block 41 is provided with a manual enable/disable input 42 which allows the user to manually enable/disable changes in the system configuration.

Once the Configuration Logic block 41 verifies the safety of implementing a given configuration, a Force Planner block 43 is fed the overall desired configuration parameters (predetermined exercise configuration data set, weight, number of repetitions, exercise trajectory, etc.). The Force Planner block 43 includes a library of force equations for each set of exercises. This library can also include exercise specifications customized by the user. The purpose of the Force Planner block 43 is to define the force equations ($F(\bar{p}_a)$) which the exercise system 10 will generate as a function of the position of the virtual mass (manipulandum) in order to give the user the feeling of performing the desired exercise, and in order to keep the manipulandum moving along a predefined virtual rail if a specific trajectory is specified. Constant velocity exercises can also be done, in which case the force planner still generates the required real-time forces to achieve the constant velocity against whatever forces are being applied by the user. For example, for the 2D "bench press" example, shown in FIG. 4, the output of the Force Planner 43 is given by the equation (1).

A Tension Planner 44 coupled to the output of the Force Planner block 43, serves to translate the force equations computed by the Force Planner block 43 and the trajectory requirements into tensions to be exerted by each of the system cables 14. Due to the potentially intensive computational requirements, the core of these computations are performed off-line. A grid of points, corresponding to positions in the 2D space, is chosen, and an optimal tension for each of the system cables 14 is calculated for each of these points. For some exercises, tension can depend also on the user applied force. The Tension Planner 44 includes a library of known force-to-tension translations for a set of common exercises. In this manner, if an exercise has been performed in the past, or if it has been otherwise stored during installation of the system, the Optimization Routine step, which will be discussed in further paragraphs, may be avoided.

As previously discussed, the forces exerted by the cables 14 must satisfy the conditions $$\bar{f}_{00}(\bar{p}_a)+\bar{f}_{01}(\bar{p}_a)+\bar{f}_{10}(\bar{p}_a)+\bar{f}_{11}(\bar{p}_a)=\bar{F}(\bar{p}_a) \quad (4)$$

Together with the condition (4), the Optimization Routine must take into consideration the physical limitations of the system. First, since the cables can only exert tension, the following conditions must also be satisfied.

$$i\ f_{ij} \geq f_{min} > 0\ i=0,1;\ j=0,1 \quad (5)$$

where the scalars $f_{ij}$ are defined in equation (3). It is understood by those skilled in the art that the minimum force exerted by the cables is not strictly 0 in order to maintain a basic level of ridigity on the system.

Second, since the motors 33 of the exercise modules 12 can only produce finite forces, the following constraint must be obeyed:

$$f_{ij} < f_{max}\ i=0,1;\ j=0,1 \quad (6)$$

The purpose of the Optimization Routine which is performed in the Optimization Routine block 45 is to obtain an optimal solution to the problem of finding a set of tensions for the system cable for each of the grid points chosen by the Tension Planner 44. By an optimal solution, is meant a solution which in some sense makes optimal use of the system resources. Consider, for example, the cost function:

$$C(\bar{f})=\Sigma_{i,j} f_{ij} \quad (7)$$

Since all the forces generated by the cables are constrained to be positive, this cost function is well-defined. By minimizing C(f), the overall forces exerted by the cables are minimized. Thus, in optimizing the proposed cost function, C(f) together with the constraints defined in equations (4), (5), and (6), the Optimization Routine will obtain a feasible solution to the problem posed by the Force Planner block 43. It should be noted that the optimization problem in consideration is a linear programming problem for which there are well-known efficient solutions. It should also be noted that different cost functions can also be used.

Once the preliminary stage of defining and customizing the desired exercise routine is completed, a Repetition Logic/Look-up Table/Interpolator 46 is in control of the operation of the exercise system 10. This module is responsible for the initiation of the exercise routine, its operation, and its conclusion.

As shown in FIG. 6, the Repetition Logic/Look-up Table/Interpolator block 46 receives an enable/disable input 47 which is connected to a physical switch (dead-man-switch) which upon closure will signal the readiness of the user to begin exercising. The conclusion of the exercise is triggered by either the completion of the desired routine (number of repetitions is reached), or by the opening of the dead-man-switch as a safety measure. This type of switch is spring-loaded to open in case the user becomes in any way incapacitated or simply wishes to stop the exercise. Other safety means can also be provided, including a voice activated "off" switch, and physical blocks on the cables to insure the exercise device cannot move out of a desired operating region.

The Repetition Logic/Look-up Table/Interpolator 46 is also responsible for the operation of the exercise system 10 during the exercise routine. It receives as an input, the Tension Table created by the Tension Planner 44. The Tension Table corresponds to the solution of the optimization problem as evaluated by the Optimization Routine module 45 for a discrete number of points in the space. With the help of an interpolation routine in the Repetition Logic/Look-up Table/Interpolator module 46, it will "fill in the gaps" between the discrete points for which solutions are available in the Tension Table. In this manner, a set of desired tensions are determined for all possible positions ($\bar{p}_a$) of the virtual mass, i.e., manipulandum 11. The Repetition Logic of the Repetition Logic/Look-up Table/Interpolator module 46 keeps track of the number of times a given exercise or motion has been performed. This information is useful not only for display purposes (and to conclude the exercise routine), but also to open the possibility of modifying the exercise being performed after a given number of repetitions.

A Dynamic Controller 48 is coupled to the output of the module 46 to insure that the tension actuators (DC motor drive electronics 29) produce the desired tension on all cables 14 as dictated by the Repetition Logic/Look-up Table/Interpolator module 46. The Dynamic Controller 48 receives as its input both the desired tension of all cables 14 and the actual tension of all cables 14 together with all other relevant information regarding the state of the tension actuator (position, velocity, etc.).

In turn, the Dynamic Controller 48 produces all signals necessary to achieve the desired cable tension through the DC motor drive electronics 29 of each exercise module 12. The DC motor drive electronics 29 generally include respective power supplies, motors, and drivers which provide the tension to the system's cables 14 which will be described more fully in detail in further paragraphs.

A Length-to-Position Conversion module 49 translates the length of the cables 14 attached to a mass a (labeled $l_a$) into the position and orientation of the manipulandum 11 in the reference framing structure 13 under consideration. Once the geometry of the exercise system is fixed, module 49 is implemented by a look-up table. The information from the module 49 is supplied to the Repetition Logic/Look-up Table/Interpolator module 46.

As will be clearly understood by those skilled in the art, the proposed implementation of the exercise system 10 of the present invention allows for considerable degrees of freedom in specifying the desired exercise motion. For example, it is possible to simulate the presence of rails through which the virtual weight must move as well as different effort profiles, for example, variable effort which conventional weight machines cannot provide. Passive motion therapy can also be done for physical therapy applications.

In order to describe the complete 3D system, some generalizations to the descriptions of the 2D system is made. In particular, as well as in the foregoing description, the "bench press" example will be used to clarify the equations used and solved at each step of the process.

For the "bench press" exercise, the required input will be the desired mass, or weight, and the number of repetitions. Also, in order to permit accommodation of users of different body size, an upper and lower bound on the motion of the virtual weight is entered. This input can be entered either manually, or downloaded from a network. Input parameters then include: exercise ID, exercise parameters, mass, minimum vertical displacement, maximum vertical displacement, and number of repetitions.

Figure 7:
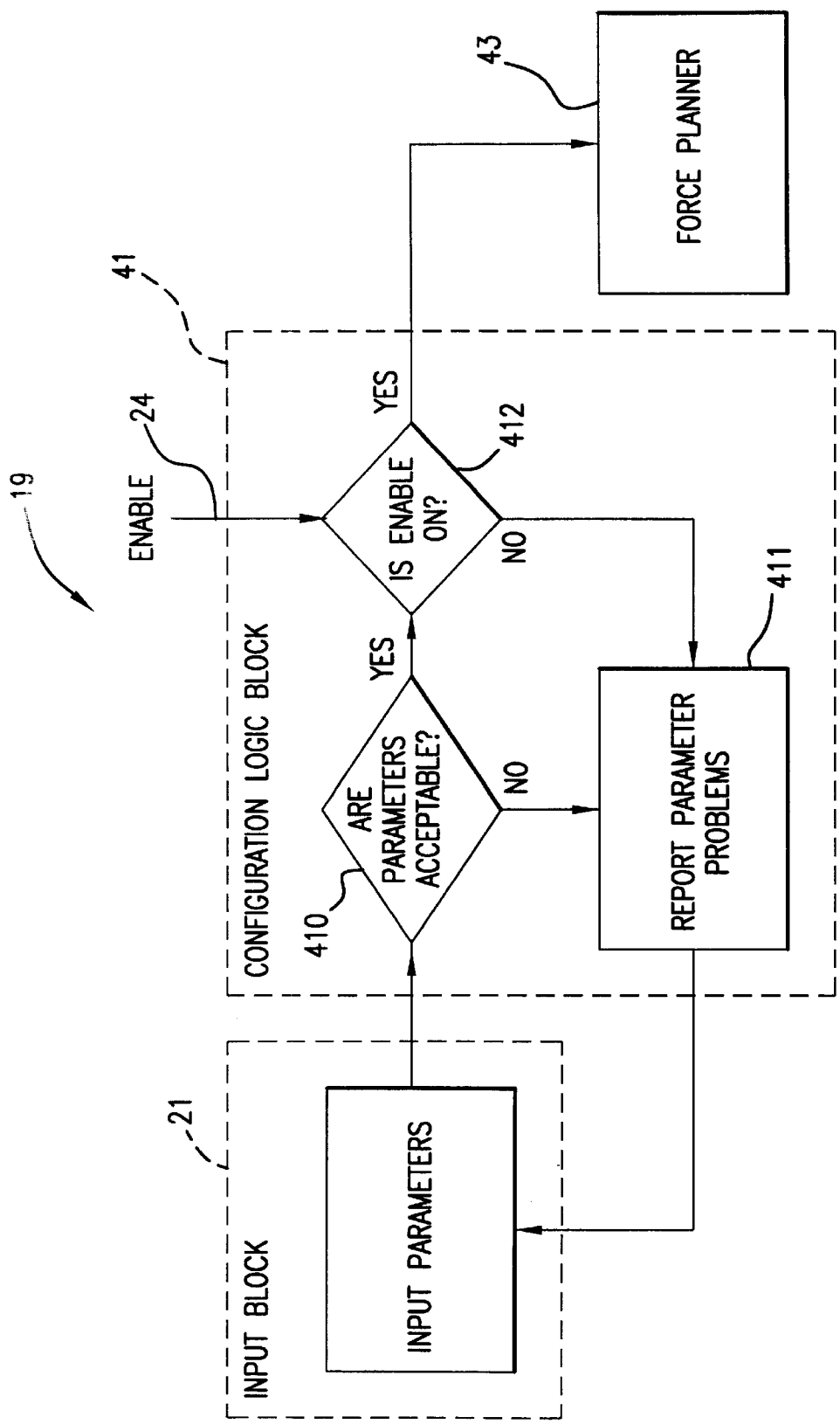
FIG. 7 shows a block diagram describing the interaction between the input unit and configuration logic interaction.

As shown in FIG. 7, the Configuration Logic block 41 operates in conjunction with the Input block 21. The main purpose of the Configuration Logic block 41, similar to FIG. 6, is to verify that all parameters corresponding to the desired exercise are acceptable, and that the user is ready to perform their exercises.

In the Configuration Logic block 41, the procedure is initiated in flow block 410: "Are parameters acceptable?". Block 410 receives the parameters corresponding to the desired exercise from the Input block 21 and decides whether these parameters are acceptable for a particular user. If the answer is "No," the logic proceeds to the flow block 411 "Report Parameter Problems," where the unacceptable parameters are fed back to the Input block 21 to adjust them to the "level" of acceptance. If, however, the answer in the block 410 is "Yes", the logic proceeds to flow block 412: "Is Enable On?" If the answer to the block 412 is "No", the procedure returns to the Input block 21 through the block 411 stating that the user did not enable the changes in the system.

Once the Configuration Logic block 41 confirms the safety of implementing a given configuration, i.e., the answer to the block 412 is "Yes", the Force Planner block 43 is fed the overall desired configuration. The purpose of the block 43 is to calculate the forces which the exercise system 10 generates as a function of the position of the virtual mass in order to give the user the feeling of performing the desired exercise. The input to the Force Planner block 43 may include the following parameters: exercise ID, exercise parameters including desired trajectory, mass, minimum and maximum displacements in each direction. The Force Planner 43 maps the input parameters to the force equation corresponding to the desired exercise, which are stored in a database.

Because the "bench press" exercise includes a bar with two weights at opposing ends, the Force Planner 43 indicates the forces to be simulated for both weights. If $\bar{p}_a$ and $\bar{p}_b$ denote the positions of the virtual masses, (mass a and b) in the 3D reference frame, and assuming that mass a is simulated by cables $L_{000}$, $L_{001}$, $L_{010}$, $L_{011}$, while mass b is simulated by cables $L_{100}$, $L_{101}$, $L_{110}$, $L_{111}$, the complete set of equations to be produced by the Force Planner block 43 can be written as will be described in following paragraphs.

In order to implement the desired vertical range limits, three independent regions of operations are to be considered. Each of these regions will apply to each mass independently. The following equations 8–11 represent the Force Planner pseudo-code (code logic) for a "bench press" exercise:

(a) if $h_{min} < [\bar{p}_a]_z < h_{max}$ % mass is within vertical range;

$$\bar{F}_a(\bar{p}_a) = -mg\hat{k} - \bar{f}_{ab} \qquad (8)$$

(b) if $[\bar{p}_a]_z \geq h_{max}$ % mass is higher than maximum vertical displacement;

$$\bar{F}_a(\bar{p}_a) = \bar{f}_{max}(\bar{p}_a - \hat{k}) - \bar{f}_{ab}' \qquad (9)$$

(c) if $[\bar{p}_a]_z \leq h_{min}$ % mass is lower than minimum vertical displacement $$\bar{F}_a(\bar{p}_a) = \bar{f}_{max}(\bar{p}_a + \hat{k}) - \bar{f}_{ab} \qquad (10)$$

end

These forces are produced by the cables $$\bar{f}_{000}(\bar{p}_a) + \bar{f}_{001}(\bar{p}_a) + \bar{f}_{010}(\bar{p}_a) + \bar{f}_{011}(\bar{p}_a) = \bar{F}_a(\bar{p}_a) \qquad (11)$$

The equations 8–11 correspond to mass a, where $[\bar{p}_a]_z$ denotes the z component (vertical position) of the vector $\bar{p}_a$, and $\bar{f}_{ab}$ is the force created by the bench press bar along its axis acting on the mass a, which implies that $\bar{f}_{ab}$ can be expressed as:

$$\bar{f}_{ab} = f_{ab} \frac{(\bar{p}_a - \bar{p}_b)}{\|\bar{p}_a - \bar{p}_b\|} \qquad (12)$$

where $\bar{f}_{max}(\bar{p}_a, \bar{x})$ denotes the largest possible force which the cables (motors) can provide along the X direction when the cable ends 18 are in position $\bar{p}$ with respect to the reference frame structure 13 (this maximum force depends on the geometry, and thus on the position $\bar{p}_a$) In Eqn. (8) the effect of inertia has been ignored which exists in the current implementation for simplicity, however, this term is intended to be incorporated in future implementations. The code corresponding to mass b is similar to the code corresponding to the mass a, with some obvious modifications.

Eqn. 8 corresponds to the exercise range specified by the parameters $h_{min}$, and $h_{max}$ (minimum and maximum vertical range displacement). Equations (9) and (10) implement the boundaries defined by the same parameters.

It will be appreciated by those skilled in the art that virtual "physical boundaries" have been introduced in the trajectory of the virtual masses. This same technique can be used to constrain the trajectory of the virtual masses in any other direction; for example, to force the user to perform the exercise in a diagonal trajectory instead of the conventional vertical trajectory.

As another example, consider the case of an isokinetic exercise. For this type of exercise, the user applies at least a predefined level of force in a predefined direction, and the exercise member then displaces at a fixed predefined velocity independent of the force applied by the user, provided only it is above the preset minimum level.

In this case, there are two separate conditions.

Condition 1. The combined force vector from the force sensors > preset level

Action 1. Control cable extension to achieve a predefined velocity along a predefined path. The desired exercise member position can easily be used to determine the extension of each of the cables required to achieve that position. A simple control law such as a proportional, integral, derivative (PID) control law can be used to control the displacement of each cable to achieve the desired displacement of each cable. The combination of these displacements then achieves the desired exercise trajectory.

Condition 2. The combined force vector from the force sensors < preset level.

Action 2. Generate forces in the cables to prevent any motion. This will effectively be generating a net force on the exercise member equal and opposite to that applied by the user to then yield no net motion. There are several ways to implement this goal. The simplest is controlling the displacement of the cable directly to prevent any change in displacement. The same PID control law used above can achieve this goal.

Instead of a "rigid" rail which prevents any motion not in the desired direction, modifying the control law parameters can achieve a predefined stiffness, such that restoring forces generated are proportional to the deviation from the desired trajectory.

The purpose of the Tension Planner 44 in 3D system is to translate the forces indicated by the Force Planner 43 into tensions for each of the cables 14 of the system 10.

A grid of points (corresponding to positions in the 3D space) is chosen by the tension planner 44, and a set of optimal tensions is calculated for each of these points for each of the cables 14. These tensions may also be a function of force applied by the user. This computation is performed through the interaction of the Tension Planner 44 and the Optimization Routine module 45. The Tension Planner 44 transfers the information produced by the Force Planner 43 to the Optimization Routine 45. The Tension Planner 44 includes a library of known force-to-tension translations for a set of common exercises. In this manner, the Optimization Routine step may be bypassed if an exercise has been performed in the past or has been otherwise stored during installation of the system.

The purpose of the Optimization Routine in 3D system, as well as in 2D system is to obtain an optimal solution to the problem of finding a set of tensions for the cables 14 for each of the points chosen by the Tension Planner 44. Such solution must satisfy a number of conditions. The overall force exerted by the cables 14 must equal the forces dictated by the Force Planner 43. For the "bench press" exercise, these forces are of the form:

$$\bar{f}_{000}(\bar{p}_a) + \bar{f}_{001}(\bar{p}_a) + \bar{f}_{010}(\bar{p}_a) + \bar{f}_{011}(\bar{p}_a) = \bar{F}_a(\bar{p}_a) \quad (13)$$

where $\bar{F}_a(\bar{p}_a)$ has been specified with reference to Eqn. 8–11, and $$\bar{f}_{100}(\bar{p}_b) + \bar{f}_{101}(\bar{p}_b) + \bar{f}_{110}(\bar{p}_b) + \bar{f}_{111}(\bar{p}_b) = \bar{F}_b(\bar{p}_b) \quad (14)$$

where the force vectors can be expressed as:

$$\bar{f}_{0jk}(\bar{p}_a) = \bar{f}_{0jk} \frac{(\bar{x}_{0jk} - \bar{p}_a)}{\|(\bar{x}^*_{0jk} - \bar{p}_a)\|}, \quad (15)$$

$$\bar{f}_{1jk}(\bar{p}_b) = \bar{f}_{1jk} \frac{\bar{x}_{1jk} - \bar{p}_b}{\|(\bar{x}^*_{1jk} - \bar{p}_b)\|}$$

Equations 13, 14 and 15 define the set of equations which must be satisfied. This amounts (for the "bench press" problem) to 6 equations and 9 unknowns. It is because of the under-determination of the unknowns that it is possible to formulate an optimization problem.

Since the cables can only pull (not push) the virtual mass a second set of conditions must be satisfied. According to Eqn. (15), this condition can be expressed as:

$$f_{ijk} \geq f_{min} > 0 \quad i=0,1, \ j=0,1, \ k=0,1 \quad (16)$$

The minimal force to be applied by the cables is greater than zero in order to maintain a certain degree of rigidity of the overall structure. Furthermore, since the motors 33 can only produce a finite force, the constraint:

$$f_{ijk} < f_{max} \quad i=0,1, \ j=0,1, \ k=0,1 \quad (17)$$

must be satisfied.

As discussed above, as an example, the cost function is considered:

$$C(\bar{f}) = \Sigma_{ijk} f_{ijk} \quad (18)$$

By minimizing C(f), the overall forces produced by the system are minimized. Thus, by optimizing the proposed cost function C(f) together with the constraints imposed by Eqns. (13), (14), (16) and (17), the Optimization Routine obtains a feasible solution to the problem posed by the force planner 43, while minimizing the overall effort required from the systems 10.

It is important to note that cost function (18), together with the linear constraints specified by Eqns. (13), (14), (16), and (17) define a linear programming optimization problem. This problem can be solved efficiently through conventional and well known linear programming techniques. The main advantage of this cost function is the ease of implementation and minimal computational time to solve. However, it should be noted that other cost functions are also possible.

Once the preliminary stage of defining and customizing the desired exercise routine is completed, the repetition Logic/Look-up Table/Interpolator 46 is in control of the operation of the exercise system 10. Before an exercise routine begins, module 46 receives the look-up table created by the Tension Planner 44, and the number of repetitions parameter (n) entered by the user 22. The module 46 will be responsible for the initiation of the exercise routine, its operation, and its conclusion.

As seen in FIG. 6, the module 46 receives an enable/disable signal 47. This input is connected to a physical switch (dead-man-switch) which upon closure will signal the readiness of the user to begin exercising. At this point, the Repetition Logic/Look-up Table/Interpolator 46 implements the desired exercise according to the Tension Table. A counter keeps track of the number of repetitions performed by the user based on the history of the positions of the virtual masses. In the case of the "bench press" routine, this module could monitor the number of times that the virtual weights traverse the immediate height $h_{mid} = (h_{max} + h_{min})/2$. The conclusion of the exercise is triggered by either the completion of the desired routine (number of repetitions), or by the opening of the dead-man-switch (as a safety measure).

Because the lookup table generated by the Optimization Routine 45 can only contain solutions for the cable tensions for a finite number of discrete points within the 3D reference frame 13, the module 46 calculates (or estimates) the required cable tensions for all points not included in the table. Cable tension calculations are accomplished by an interpolation routine, which "fills in the gaps" between the discrete points for which solutions are available. In other words, whenever the virtual masses are in a position for which no solution is available in the lookup table, a weighted average is computed based on the 8 closest points for which a solution is available. The weights used for this average will be inversely proportional to the distance between the virtual mass position and the points for which solutions are known.

As an example, the force $f_{000}$ (the desired force for motor 000) is computed in the case when the end of its corresponding cable is in position $\bar{p}_a$.

An assumption is made that position $\bar{p}_a$ is not among those points for which the lookup table has a solution. By $\bar{p}_{ijk}$, i=0,1, j=0,1, k=0,1, the eight positions closest to $\bar{p}_a$ for which the lookup table does have a solution are denoted. A linear interpolation of the force to be commanded to $f_{000}$ would be:

$$\bar{f}_{000}(\bar{p}_a) = \frac{\sum_{ijk} \frac{\bar{f}^*_{000}(\bar{p}_{ijk})}{\|\bar{p}_{ijk} - \bar{p}_a\|}}{\sum_{ijk} \frac{1}{\|\bar{p}_{ijk} - \bar{p}_a\|}} \qquad (19)$$

where $\bar{f}_{000}(\bar{p}_{ijk})$ denotes the optimally claculated force which motor 000 would have to provide if its corresponding cable were in position $\bar{p}_{ijk}$ (which is available from the lookup table), and $\|\bar{x}\|$ denote the magnitude of a given vector $\bar{x}$.

The purpose of the dynamic controller 48 is to ensure that the electric motors 33 produce the desired tension on all cables 14 as dictated by the Repetition Logic/Look-up Table/Interpolator module 46. The Dynamic Controller 48 receives both the desired tension of all cables $\bar{f}_{ijk}(\bar{x})$, i=0,1, j=0,1, k=0,1, and the actual tension of all cables $\hat{f}_{ijk}(\bar{x})$, i=0,1, j=0,1, k=0,1. In turn, the Dynamic Controller 48 produces a voltage signal which commands the amount of torque necessary to equate $\hat{f}_{ijk}(\bar{x})$ and $\bar{f}_{ijk}(\bar{x})$ for all i=0,1, j=0,1, k=0,1. The error signal is defined as:

$$e_{ijk} = \bar{f}_{ijk} - \hat{f}_{ijk} \qquad (20)$$

and the control signal:

$$V_{ijk}(s) = K_P\left(e_{ijk}(s) + K_D s e_{ijk}(s) + \frac{K_1}{s} e_{ijk}(s)\right) \qquad (21)$$

where conventional Laplace transform notation is used. Equation (21) describes a conventional proportional-integral-differential (PID) controller. This controller can be tuned or modified to attain the desired performance.

The Length-to-Position Conversion module 49 translates the lengths $\bar{l}_a$ and $\bar{l}_b$ of cables 14 simulating the virtual masses a and b, respectively, into the position of these points in the Cartesian reference frame 13. This information is required by the Repetition Logic/Look-up Table/Interpolator module 46. Once the geometry of the exercise system 10 is fixed, the module 46 can be implemented by a look-up table.

In an example of the conversion for the case of mass a, the equation defining the length of the cables 14 attached to mass a is given by:

$$l^2_{0jk} = (\bar{p}_a - \bar{x}^0_{0jk})^{T} * (\bar{p}_a - \bar{x}^0_{0jk}) \qquad (22)$$

where $\bar{p}_a$ is calculated given the knowledge of the cable length $\bar{l}_{0jk}$ and the cable origin $\bar{x}^0_{0jk}$. A minimum of 3 such equations are needed to solve for the position of the cable end 18 since there exist three unknowns. It is assumed that at least 3 cables are attached to the same point (in the "bench press" case, there are in fact 4 cables simulating each virtual mass), and the lengths of three cables are used to calculate $\bar{p}_a$. The problem to be solved is then of the form (note that we have changed notation to a less cumbersome form):

Given $(l_i, x^0_i, y^0_i, z^0_i)$, i=1, . . . ,3, find (x,y,z) such that:

$$l^2_i = (x-x^0_1)^2 + (y-y^0_1)^2 + (z-z^0_1)^2, \; i=1, \ldots, 3. \qquad (23)$$

Defining:

$$M_{ij} = \frac{l^2_i - l^2_j - \{[(x^0_i)^2 - (x^0_j)^2] + [(y^0_i)^2(y^0_j)^2] + [(z^0_i)^2 - (z^0_j)^2]\}}{2} \qquad (24)$$

which is algebraically reduced to:

$$\begin{bmatrix} M_{12} \\ M_{23} \end{bmatrix} = \begin{bmatrix} x^0_2 - x^0_1 & y^0_2 - y^0_1 & z^0_2 - z^0_1 \\ x^0_3 - x^0_1 & y^0_3 - y^0_1 & z^0_i - z^0_1 \end{bmatrix} \begin{bmatrix} x \\ y \\ z \end{bmatrix} \qquad (25)$$

The values required to compute $M_{ij}$ are known, and so are the entries in the matrix described in Eqn (25). Equation 25 defines two intersecting planes, which in turn defines a line (assuming the matrix has full rank, which in general is the case). In other words, all solutions of Eqn (25) can be parameterized in the form:

$$y = r_{yx}x + b_{yx} \qquad x = r_{xy}y + b_{xy} \qquad x = r_{xy}z + b_{xz} \qquad (26)$$

or or $$Z = r_{zx}x + b_{zx} \qquad z = r_{zy}y + b_{zy} \qquad y = r_{yz}z + b_{yz}$$

The choice of parameterization is arbitrary, as long as the matrix in Eqn (25) has full rank. Substituting these equalities into one of the quadratic equations defined in (23) makes it possible to solve for the unknown (x,y,z) in one quadratic equation.

In the special case when the frame to which the cables are attached is a parallelogram, the matrix in Eqn. (25) will always have 2 zeros in each row. For example, in the case of mass a, and with the assumption that the position of the points $\bar{x}^0_{0jk}$ is:

$$\bar{x}^0_1 = \bar{x}^0_{000} = (0,0,0)$$

$$\bar{x}^0_2 = \bar{x}^0_{001} = (0,0,d)$$

$$\bar{x}^0_3 = \bar{x}^0_{010} = (0,d,0) \qquad (27)$$

if the first three points are taken Eqn (25) would then be given by:

$$\begin{bmatrix} M_{12} \\ M_{23} \end{bmatrix} = \begin{bmatrix} 0 & 0 & d \\ 0 & d & 0 \end{bmatrix} \begin{bmatrix} x \\ y \\ z \end{bmatrix} \qquad (28)$$

which implies that the values for y and z are obtained immediately, while the third unknown will only require the computation of a square root. In this particular sense such a frame configuration is mathematically advantageous.

In practice, this whole block may be avoided if the table generated by the Tension Planner 44 is expressed in terms of cable lengths instead of Cartesian coordinates.

Throughout the foregoing discussion it has been assumed that the position of the points where the cables (motors) are attached to the framing structure 13 is known to the system (these points are denoted by $\bar{x}^0{}_{ijk}$). This assumption can be satisfied if the geometry of the framing structure 13 is known in advance (i.e., prior to installation).

However, it is also possible to determine these points after the system has been installed by a calibration procedure. Such calibration would only be required whenever any $\bar{x}^0{}_{ijk}$ changes (i.e. if the system is installed in a different location, for example). This calibration procedure is discussed in its most general form in further paragraphs, although it can be simplified if the geometry of the frame 13 is restricted (for example, to a parallelogram).

Assuming that the position of points $\bar{x}^0{}_{ijk}$ is not known, and that there are 3 linearly independent points $\bar{q}_1, \bar{q}_2,$ and $\bar{q}_3,$ in the Cartesian reference frame 13 where positions are known, the end of each cable can be positioned at these 3 positions, and their lengths can be registered. If all cables are joined, all 8 lengths in one single operation may be recorded. The cables should be in tension so that the measured lengths are accurate. The calibration lengths $l^1{}_{ijk}, l^2{}_{ijk},$ and $l^3{}_{ijk}$ obtained where each of these lengths corresponds to the points $\bar{q}_1, \bar{q}_2,$ and $\bar{q}_3$, respectively must satisfy Eqn (29) as follows (for each cable).

$$(l^m{}_{ijk})^2 = (\bar{q}_m - \bar{x}^0{}_{ijk})^{T*}(\bar{q}_m - \bar{x}^0{}_{ijk}), \ m = 1, \ldots, 3. \quad (29)$$

where $\bar{x}^0{}_{ijk}$ is being solved. This is the same problem discussed regarding the position to length conversion block 49 (in FIG. 6) of the exercise system 10. The solution to this problem has been addressed with respect to Eqn. (23). The same solution techniques may be used for the calibration process.

As noted in previous paragraphs, the discussed implementation for the exercise system 10 does not include the simulation of inertia of the virtual masses. It should be clear, however, to those skilled in the art that the proposed hardware and software architecture allows for the simulation of this phenomenon and the fact that it has not been included in the current implementation does not reflect a limitation of the system but merely a conservative engineering approach. The proposed system is capable of simulating the effect of inertia on the virtual masses, and this effect will be incorporated if it is felt that the additional complexity justifies the effort.

Since the forces induced by inertia are proportional to the acceleration of the virtual masses, these forces will be negligible as long as the motion of the virtual masses is not "sudden". On the other hand, incorporating these effects requires real time information on the instantaneous acceleration of the virtual masses. The addition of such information and the required processing effort associated with it should not be included if the benefits of doing so do not justify the added complexity to the system. Thus, in the situations where the exercise system of the present invention without simulating inertia effects is used and if the resulting performance is satisfactory to the user, it is most likely that inertia effects will be omitted. If, on the other hand, it is determined that the performance of the system is not completely satisfactory to the user, the forces induced by inertia effects will be included.

Particularly, the logic implemented in the block diagrams shown in FIGS. 5–7, may be illustrated by flow diagrams shown in FIGS. 8–13.

Figure 8:
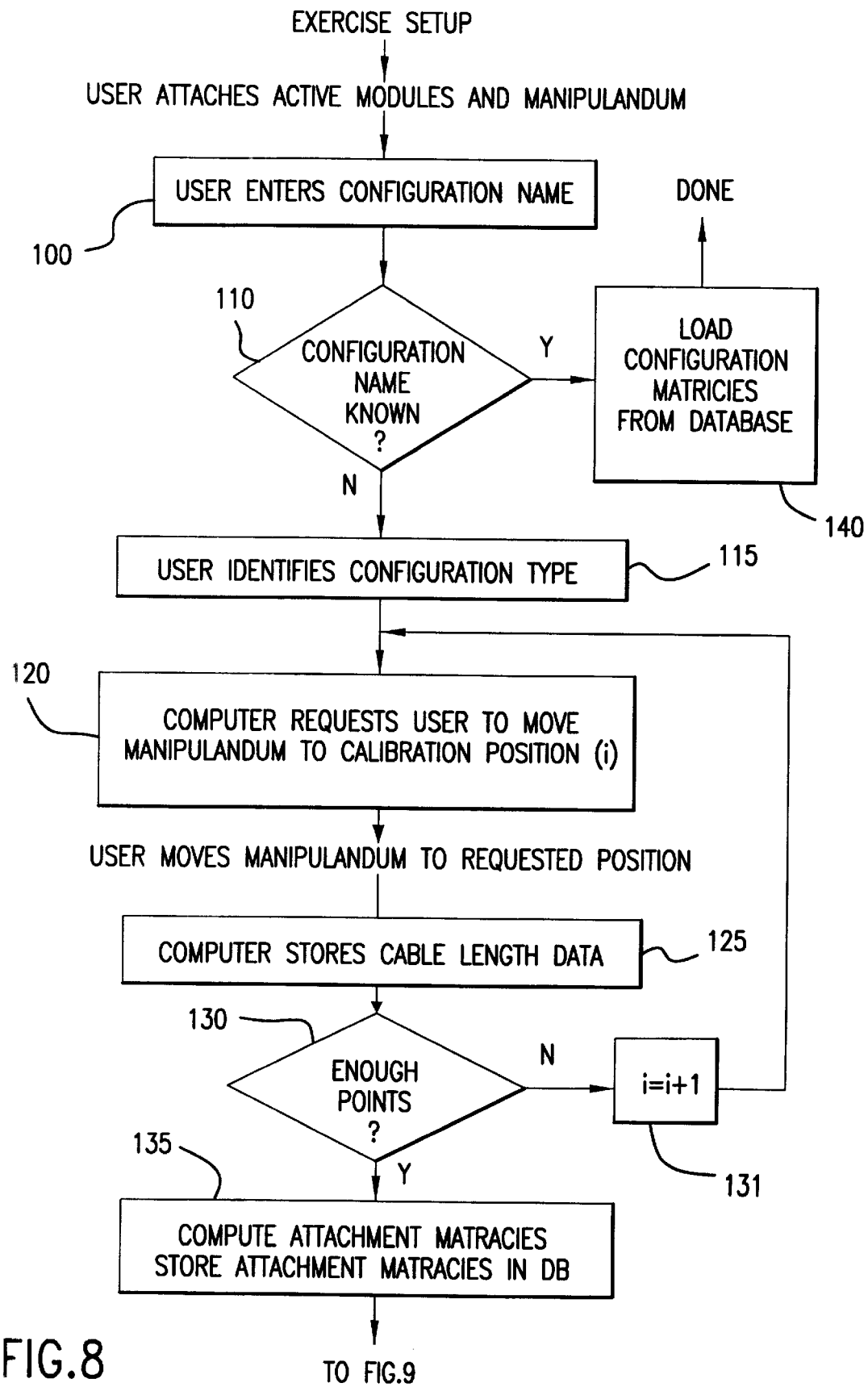
FIG. 8 is a flow diagram for the exercise set-up module of the present invention.

Referring to FIG. 8, flow control for the exercise set-up initialization/configuration module begins at flow block 100 where the user is prompted to enter a configuration name. Prompts are provided to the user on the display 20. The configuration name, if entered by the user, is recorded in the memory 36 of the control structure 19.

The logic then proceeds to the module block 110: "Configuration name known", where it is determined whether the configuration name is stored in the system. If the configuration name is not stored, i.e., the answer to the block 110 is "No", then the logic flow proceeds to block 115: "User identifies configuration type". If at the decision block 110, it is determined that the configuration name is known, i.e. the answer is "Yes", the logic flow proceeds to block 140 "Load configuration matrices from data base", where the name is used to access the already established configuration matrices associated with that configuration name and signal flow is terminated at this step.

Again, if the configuration name is not stored, the logic flow proceeds from the flow block 115 and enters the flow block 120 "Computer requests user to move manipulandum to calibration position i", where the user is prompted to move the manipulandum 11 to a predetermined calibration position. Logic flow then proceeds to flow block 125 where for each of the exercise modules 12 of the exercise system 10, the extended cable length is recorded in the system memory 36. When this is completed, the program passes to the block 130: "Enough points", wherein it is determined whether a sufficient number of calibration positions have been traversed. If it is determined that a sufficient number of calibration positions have been traversed, i.e., the answer is "Yes", then the signal flow proceeds to block 135: "Compute attachment matrices; Store attachment matrices in data base" where the geometry of the attachment points is computed.

The computed geometry is stored in a data base as the matrix of the Cartesian X,Y,Z positions of each of the attachment points for each of the exercise modules 12 for the particular configuration. Opposingly, if it is determined that an insufficient number of calibration positions have been traversed, i.e., the answer is "No", then the logic flow returns to block 120 through the flow block 131 with the points number incremented. The logic flow circulates in the loop consisting of the flow block 120, 125, 130, 131 until the answer to the block 130 will be "Yes" and the sufficient number of calibration positions of the manipulandum 11 will be traversed.

Figure 9:
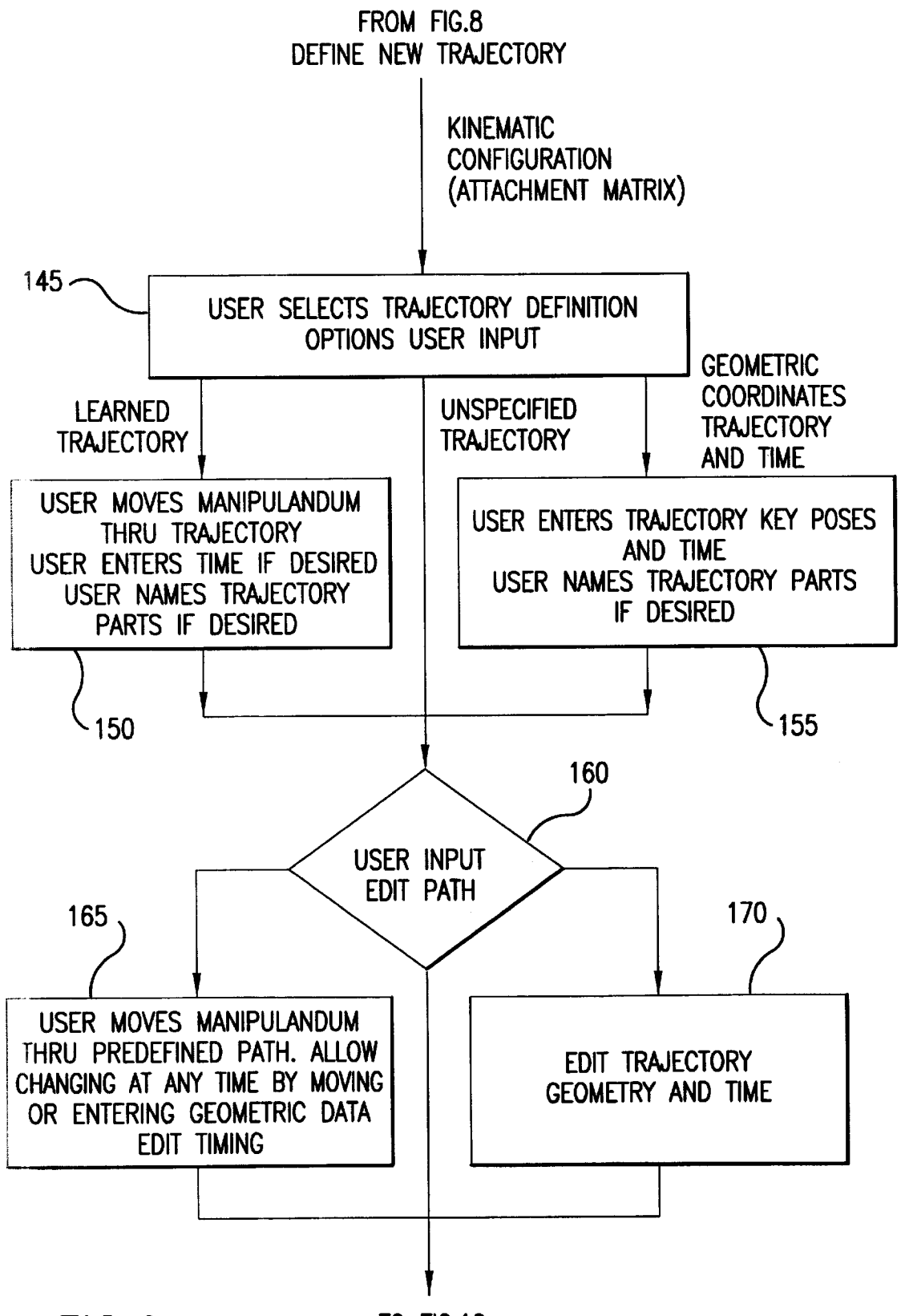
FIG. 9 is a flow diagram for the trajectory definition module of the present invention.
Figure 10:
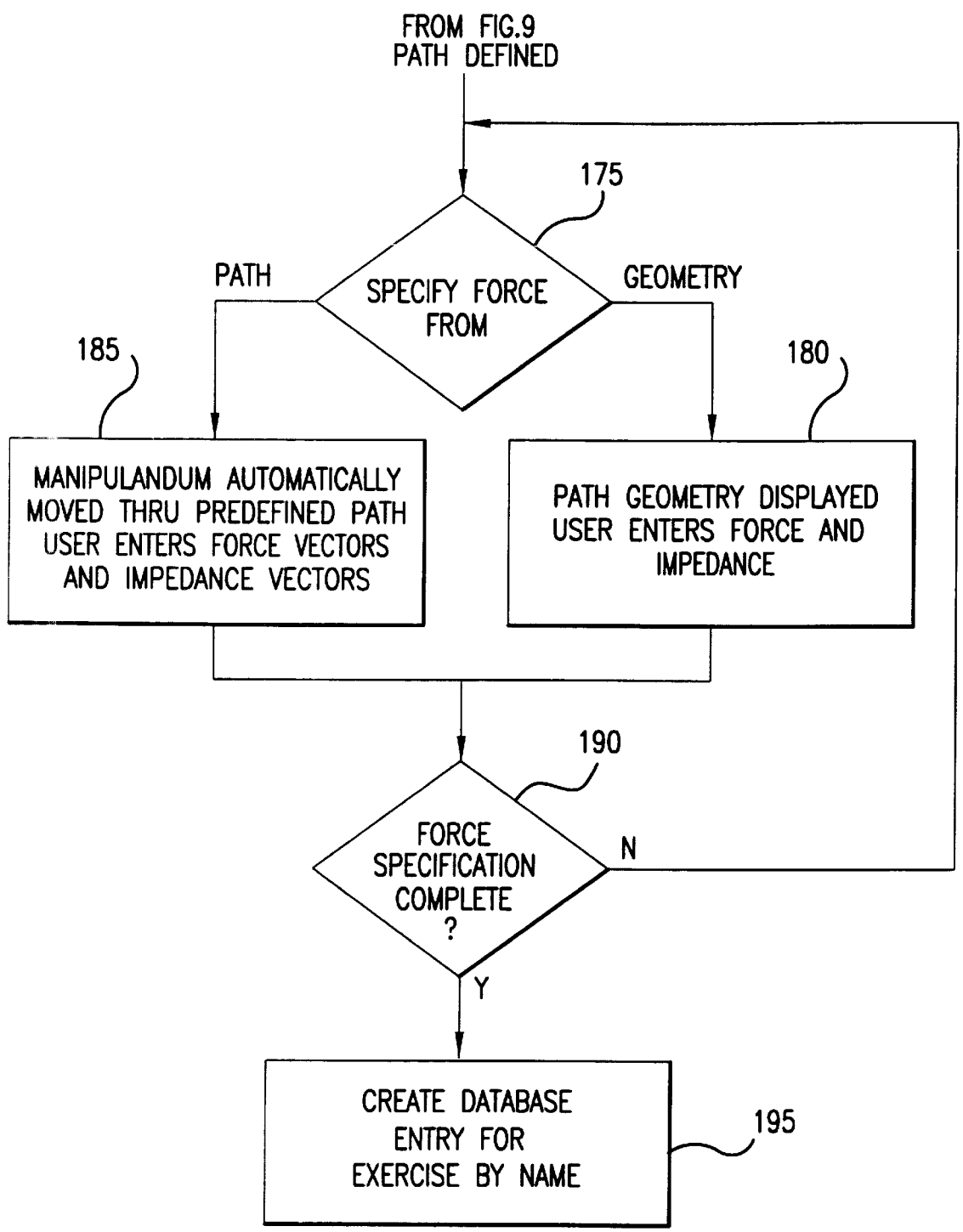
FIG. 10 is a flow diagram for the path definition module of the present invention.

Referring to FIGS. 9 and 10, computer program flow control is illustrated for the creation and storage of predetermined exercise trajectories and their associated resistive forces to be simulated. Particularly, in FIG. 9, the program flow control is Illustrated for establishing an exercise trajectory beginning at the flow block 145 wherein the user is prompted to select one of three exercise trajectory definition options, including: "learn trajectory", "unspecified trajectory", and "geometric coordinate trajectory".

If the learning trajectory option is selected by the user, the flow control proceeds to block 150 where the user is prompted to optionally enter a trajectory name, or names for various trajectory segments of the overall exercise trajectory or the user can physically move the exercise member through a trajectory segment, and then name that segment if desired. The exercise module cable displacements are recorded in memory 36 in association with the identified trajectories. If desired, the user can also enter the time duration (speed) of segments.

If the user selects the "geometric coordinate trajectory" option at block 145, then the logic flows to the block 155, where the user is prompted to optionally enter key names for trajectory segments of an overall exercise trajectory, or to optimally enter geometric coordinates, for example, x, y, z coordinates for various points along a trajectory. Trajectory coordinate points are then entered and the user is prompted to optionally enter a time or speed in association with each of the geometric coordinate points. All of the foregoing user entered information is recorded in the system memory 36 in association with any user specified trajectory names. If, however, at the flow block 145, the user selects "unspecified trajectory", then the flow control is terminated.

Upon completion of the flow blocks 150 and 155, the logic proceeds to decision block 160: "User input edit path", where the user is prompted to optionally edit either the previously entered code "learned trajectory", or "geometric coordinate trajectory". If the user selects the "learned trajectory", then flow control proceeds to the block 165 where the user is prompted in the manner as described in relation to the flow block 150. All information prompted in the block 165 is recorded in the system memory 36.

Alternatively, i f the user edit selects "geometric coordinate trajectory", then flow control proceeds to block 170, where the user is prompted in the manner as previously described in relation to block 155 and the information is recorded in the system memory 36.

Upon completion of the flow blocks 165 and 170, or if the user selects not to edit the exercise trajectory path, then the establishment of the trajectory path is completed, and the logic flows to the decision block 175: "Specify force from" shown in FIG. 10. Within flow block 175, the user is prompted to select whether forces for the previously established exercise trajectory will now be specified based on the trajectory geometric coordinates, or the taught trajectory path. If the user selects force specification based on trajectory geometric coordinates, then the logic flows to the flow block 180, where the previously entered path geometry is displayed, and the user is prompted to enter force and optional torque values at each display trajectory coordinate with user entries being recorded in memory 36.

If, however, at the flow block 175, the user selects the specification of forces along the pretaught path, then the flow control proceeds to block 185 where the exercise member is automatically moved through the pretaught trajectory points, previously stored in memory 36, and at selected coordinates, the user is prompted to enter force vectors corresponding to that position of the manipulandum. The force vectors entered by the user are recorded in association with each of the trajectory coordinates in the series.

In each of blocks 180 and 185, the user entries are verified as being within achievable exercise system limitations. Should an entered value not pass verification, a corresponding error message is provided to the user in association with a "closest value" which is achievable for the previously entered data.

Upon completion of the flow blocks 180 and 185 the flow proceeds to the flow block 190 where it is determined whether sufficient information has been entered by the user to specify forces along the predetermined and recorded trajectory. If insufficient data has been entered, i.e., the answer to the block 190 is "No", then the flow control returns to the input of the block 185. Otherwise, sufficient information has been entered, i.e., the answer to the block 190 is "Yes", and the flow control proceeds to the block 195, where a data base of the previously entered information is created and stored in the memory 36 in association with a name entered by the user with flow control being terminated after the block 195.

Figure 11:
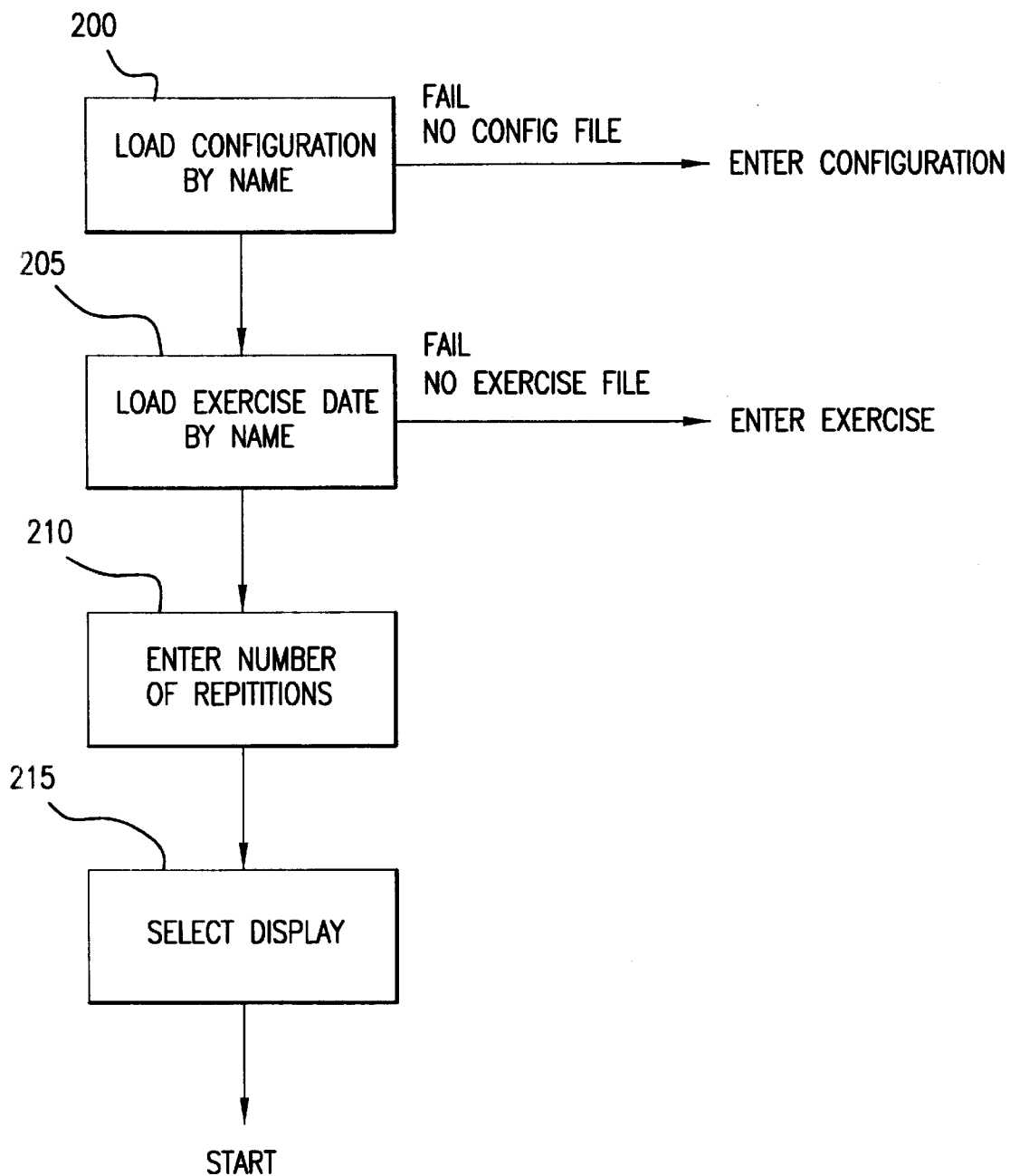
FIG. 11 is a flow diagram for the exercise initiation module of the present invention.

FIG. 11 illustrates the flow control associated with the exercise initiate routine of the Repetition Logic/Look-up Table/Interpolator module 46. The flow control begins at block 200 where the user is prompted to enter a trajectory configuration name. When the configuration name is entered, the procedure flows to block 205, where the appropriately named data base is accessed. If, however, no requested configuration file has been found in the block 200, or no requested exercise data base has been found in the block 205, the logic prompts the user to re-enter configuration name and exercise data base.

Upon completion of the flow block 205, the logic proceeds to block 210 where the user is prompted to optionally enter a number of exercise repetitions required. When the number of repetitions has been entered, this number is recorded in the memory 36. From block 210, the logic flows to the flow block 215, where the user is prompted to select the variety of parameters that are to be displayed during a subsequent use of the exercise system 10 for exercise. The flow control exits the exercise initiate routine after the block 215 is completed.

Figure 12:
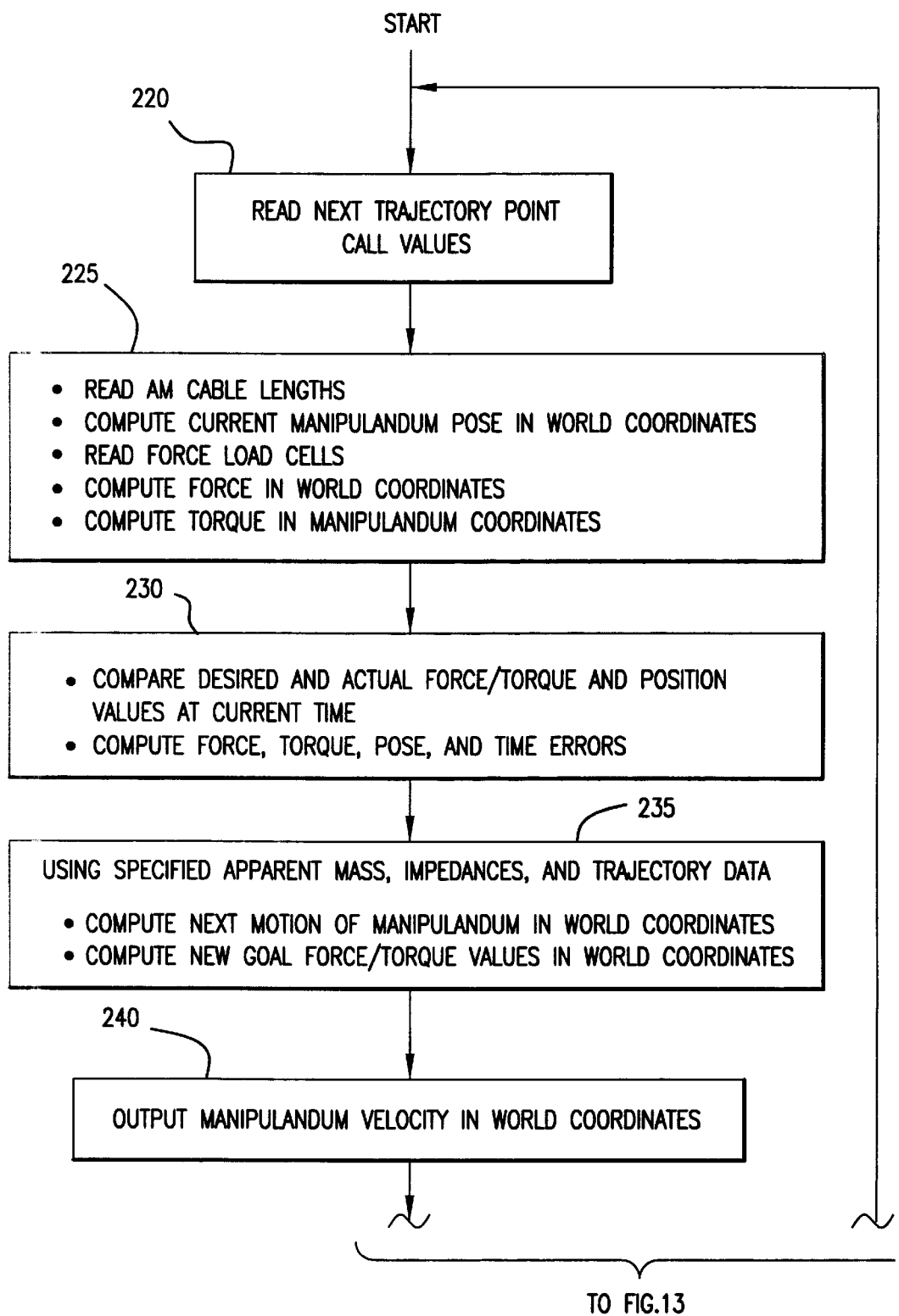
FIGS. 12 and 13 are flow diagrams for the real time loop—world coordinates module of the present invention.
Figure 13:
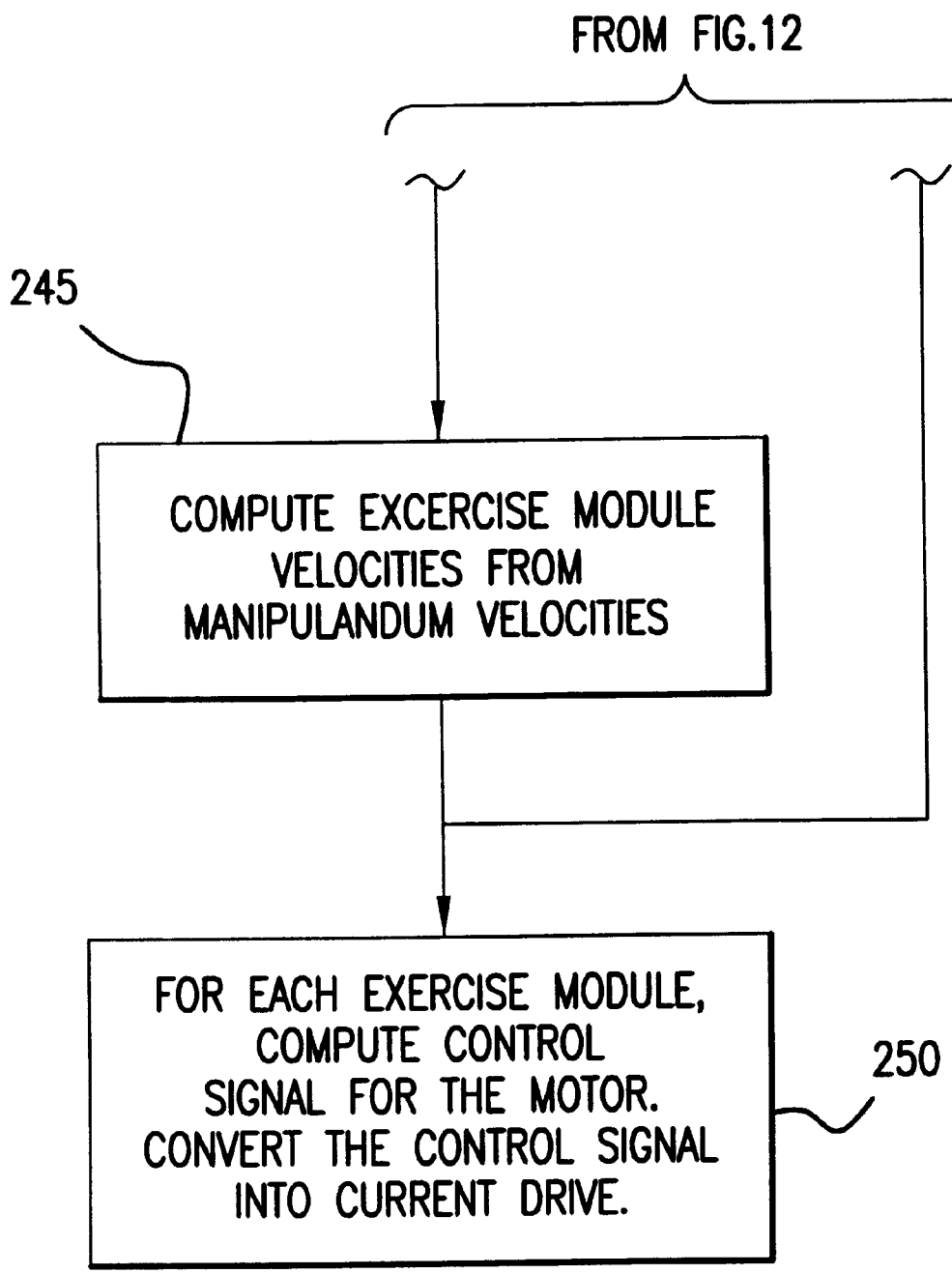

FIG. 12 illustrates a real time loop processing module which executes when the user is actually using the exercise system of the present invention to perform exercises as is shown in FIGS. 1A–1J. The logic module shown in FIGS. 12, 13, executes cyclically, from the start module block 220 to finish, for example, every 10 milliseconds.

Thus, flow control begins at block 220 where a next trajectory point is accessed from the previously stored trajectory data base defined during the execution of the exercise set-up module illustrated in FIG. 8. Within flow block 220, an apriori data set is accessed in memory including a desired apriori trajectory position and forces associated therewith. The logic then proceeds to block 225, where the following steps are performed:

(1) extended cable length for each of the exercise modules in the exercise system is read;

(2) the position of the manipulandum in "world coordinates", that is in X, Y, Z coordinates, is computed based on the recorded extended cable length;

(3) the tension forces in each of the extended cables of each of the exercise modules are recorded;

(4) a force vector is computed from these tension forces in association with the "world coordinate" of the manipulandum 11. This force vector is a resultant force combining the direction and magnitude of the sensed and recorded extended cable tension forces; and, (5) torques are computed based on the recorded cable extension and tension.

The procedure then flows to flow block 230, where a comparison is made between the force and position data set corresponding to the apriori "next trajectory" data accessed in the flow block 220 and the manipulandum position, and further force vector (torque) computed in the flow block 225. Outputs from these comparisons are force, torque, position, and timing errors. The flow control then proceeds to block 235, where the next positional motion and force requirement for the manipulandum 11 is computed. Inputs to this computation include apparent mass, impedances, and trajectory data previously specified by the user and stored within system memory.

Upon completion of the flow block 235, the logic proceeds to block 240, wherein the manipulandum velocity is computed based on its change in position over time, e.g., its change in position over the last 10 milliseconds. The flow control proceeds to block 245 shown in FIG. 13, where the manipulandum velocity is transformed into a plurality of velocities for each of the exercise module extended cables.

The signal flow then proceeds to a flow block 250, wherein both signals necessary to achieve the desired cable tensions through the tension actuator (DC motors 33) is computed (according to some control law, such as a PID controller) for each exercise module 12. These signals are transmitted to the exercise module interface, and the flow control returns to the beginning block, that is flow block 220. The signal computed in the flow block 250 is converted by the interface circuitry of each exercise module 12 into respective current drives for the reversible DC motor 33 in each of the exercise modules 12, in order to generate the required tension force in each of the cables 14.

Turning now to the specific hardware structural details, each exercise module 12, also referred to as active module (AM), can produce 90 pounds of pull and a speed of over 3 feet per second. The exercise module 12, as shown in FIGS. 14–19, includes an outer module housing 50 which, being assembled, constitutes a thermoformed polycarbonate sphere that provides protection for the unit, noise reduction, and allows air flow to be directed over the motor/drum assembly (to be described in further paragraphs), which has a resilient reversibly displaceable cable 14 extending therefrom. Within the module housing 50, there is installed a cable spool (or rotating reel) 34 that is reversibly rotatively coupled to the module housing 50. The reel 34 is made from aluminum or any other suitably hard and strong material.

Figure 2:
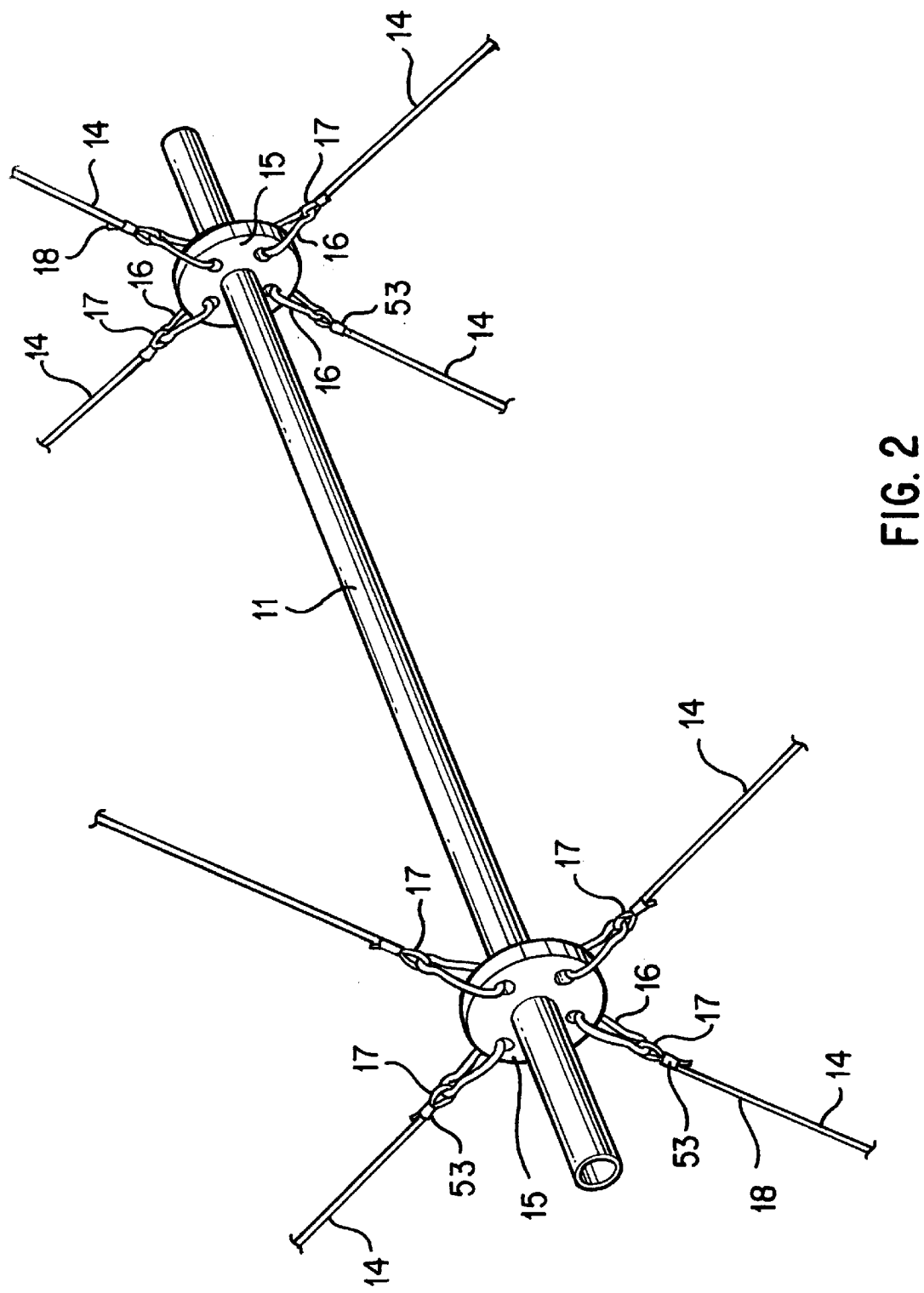
FIG. 2 shows in perspective and partially cut-away an exercise member (manipulandum) with cables attached thereto.
Figure 14:
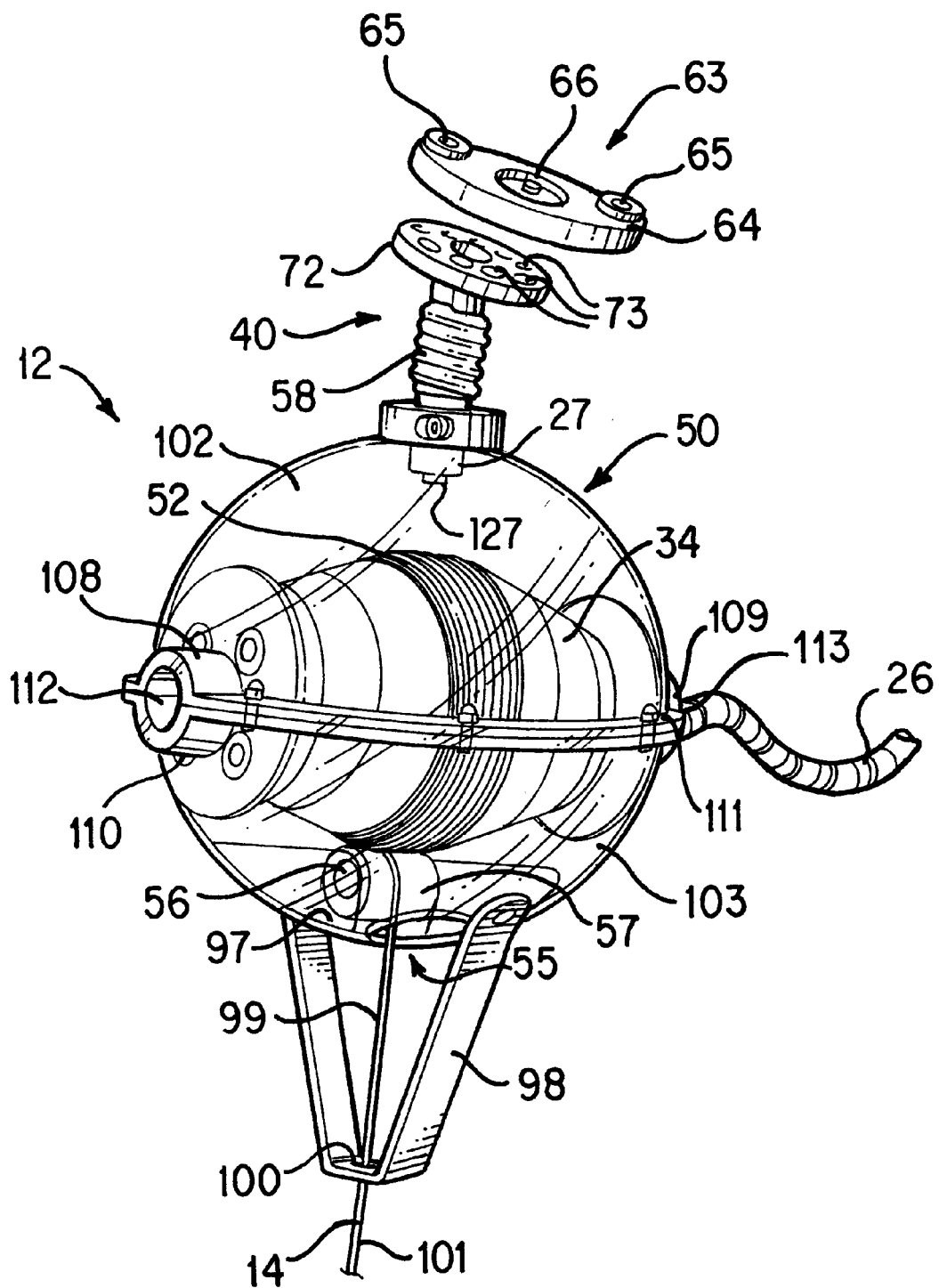
FIG. 14 is a perspective view of the exercise module of the present invention.
Figure 15:
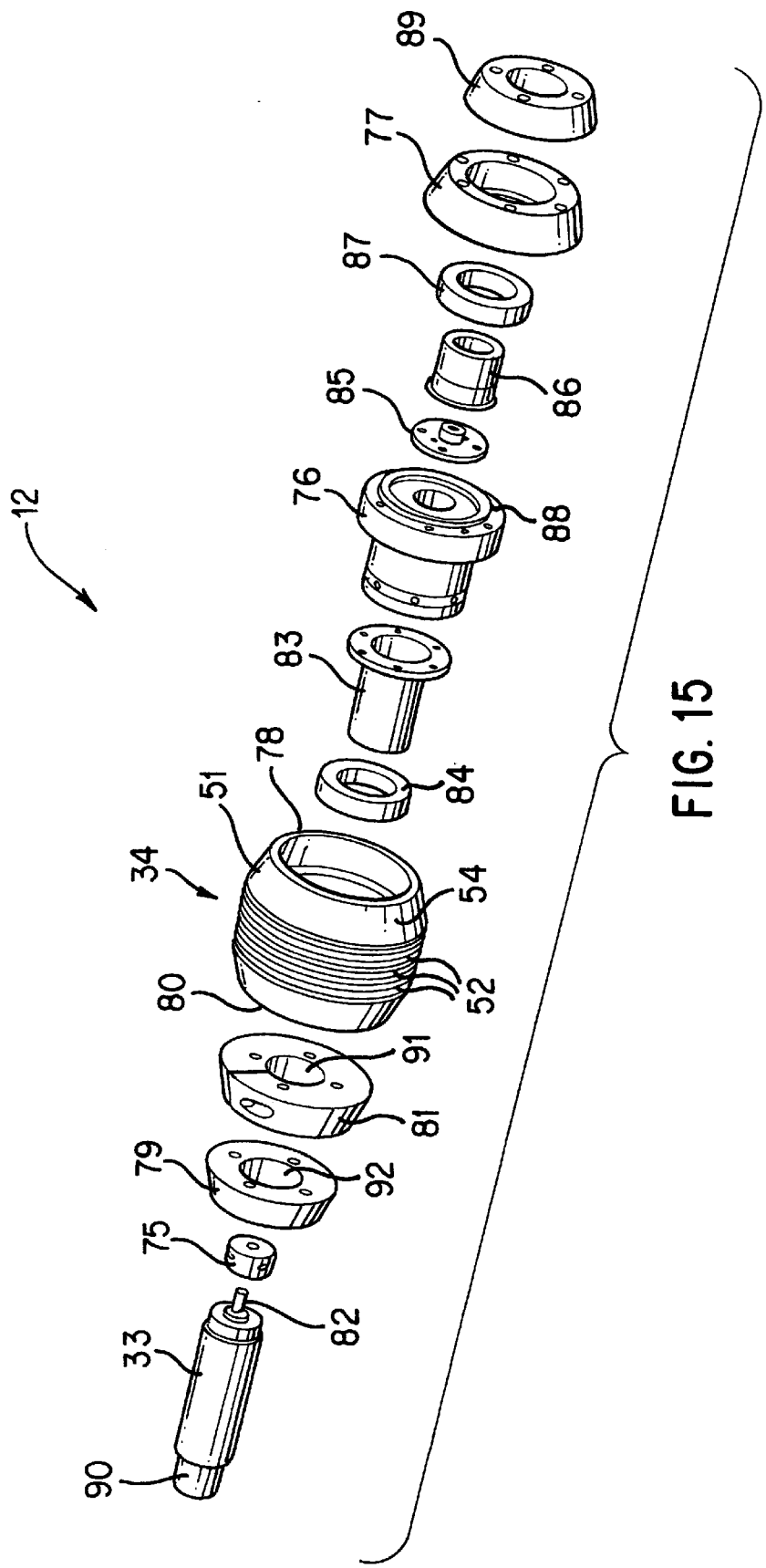
FIG. 15 is an exploded view of the elements within the active module of the present invention.

As best shown in FIGS. 14 and 15, the reel 34 is made in the form of a drum element 51 having on its surface annularly extending grooves 52 for orderly receiving the cable 14 therein. The cable 14 has an end thereof reversibly wound around the drum element 51 of the reel 34. Each cable 14 is made of a high strength and a high stiffness material. Coupled to the opposing displaced or unwound end 18 of the cable 14 is a ball stop 53 and the loop 17 which is coupled to the latching hook 16 on the end member 15 of the manipulandum 11 as was discussed in previous paragraphs and is best shown in FIG. 2.

Figure 20:
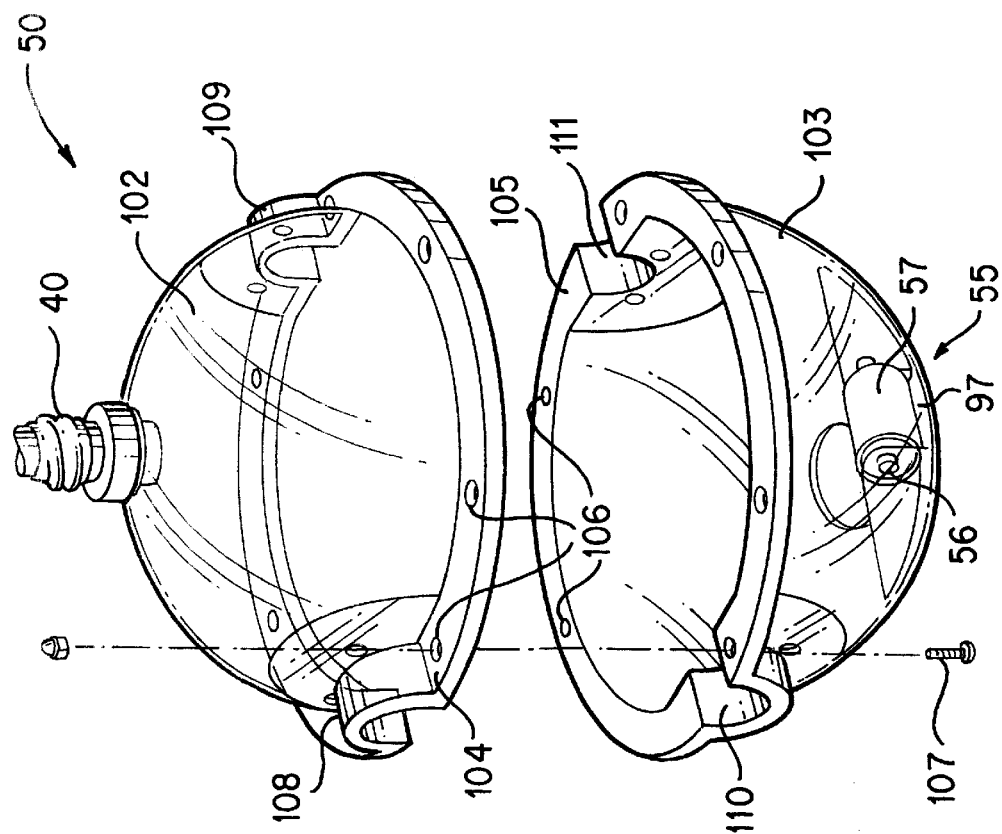
FIG. 20 is an exploded perspective view of the housing of the exercise module of the present invention.

To insure that the cable 14 is wound smoothly and in a non-overlapping manner around the surface 54 of the drum 51 and that it is received within the grooves 52, a roll 55 is provided which is snugly fit in a cavity 97 specifically designed for this purpose within one of the semi-spheres of the module housing 50 as shown in FIG. 20.

The guide roll 55 includes an internal cylinder 56 which is immovably secured within the cavity 97 and an outer cylinder 57 located coaxial with the internal cylinder 56 disposed in ball-bearing coupling engagement between the outer surface of the internal cylinder 56 and the inner surface of the outer cylinder 57.

The outer cylinder 57 is capable of rotation about its central axis coinciding with the central axis of the internal cylinder 56. The outer surface of the outer cylinder 57 is disposed in close proximity to the surface 54 of the drum element 51. In this manner, the cable 14 wound on the drum element 51 is tightly pressed between the surface 54 of the drum element 51 and the outer surface of the outer cylinder 57 of the guide roll 55. When the cable 14 is unwound from or upwound onto the drum element 51, the outer cylinder 57 rotates in the direction forced by the moving cable 14, which facilitates unwinding or upwinding the cable 14 and simultaneously pressing the same towards the surface 54 of the drum element 51.

Figure 19:
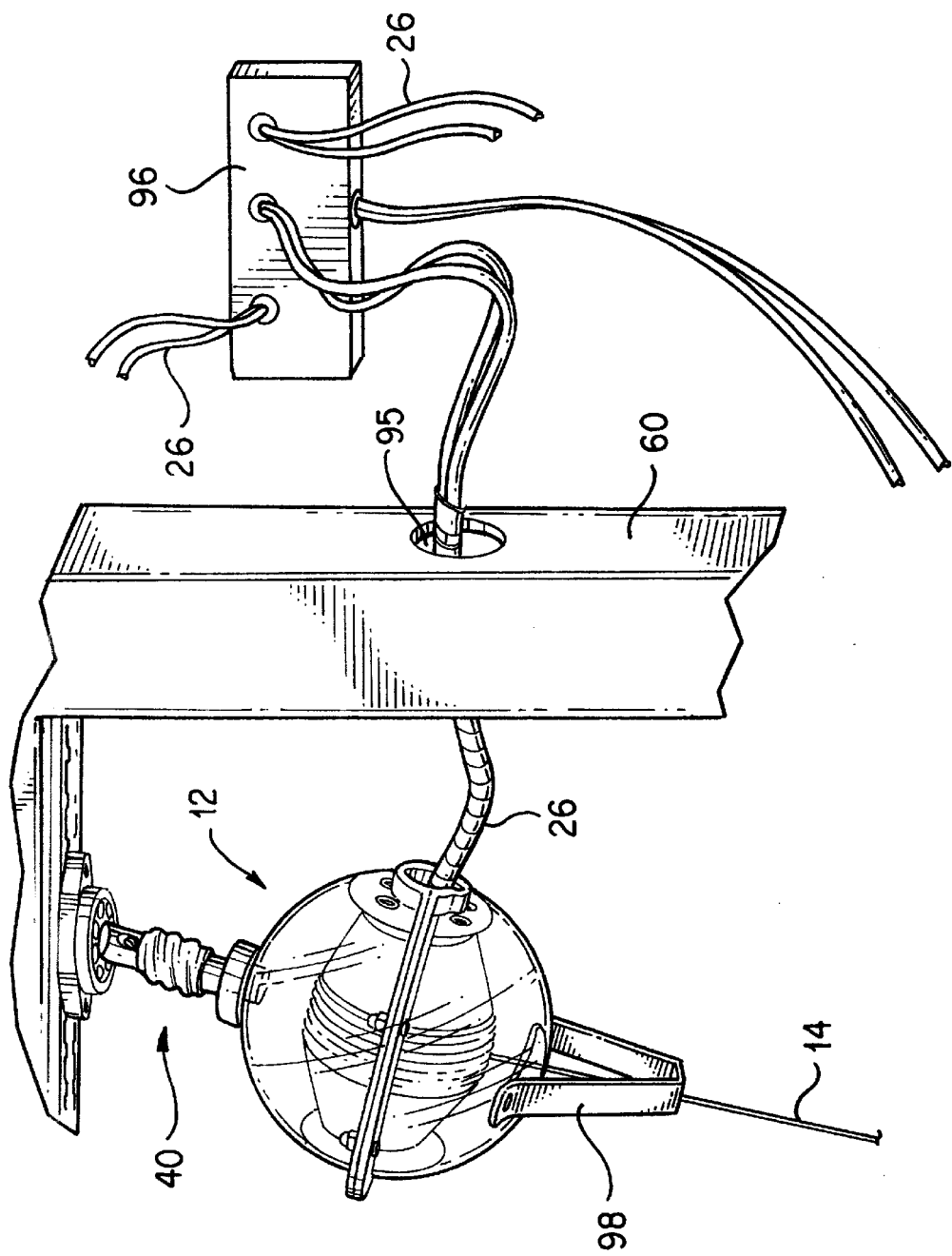
FIG. 19 is a perspective view of the active module attached to the framing structure and the harnessing fed to the auxiliary box of the present invention.

A guiding member 98, best shown in FIGS. 14 and 19, is secured to the housing 50 for keeping the portion 99 of the cable 14 extending between the drum element 51 and the guiding member 98 in optimal unchangeable orientation with respect to the wound portion of the cable 14. This creates a proper distribution of force vectors in the cable 14, specifically in the portion 99 thereof, thereby further facilitating a smooth winding of the cable 14 onto the drum element 51 and unwinding therefrom.

The guiding member 98 is provided with an aperture 100 through which the extended end of the cable 14 passes. By this arrangement, the portion 99 of the cable 14 is prevented from any deviation from its pre-established orientation with respect to the drum element 51 when the manipulandum 11 moves along a certain trajectory and forces the cables 14 to change their orientation in space.

It will be understood by those skilled in the art that in order to avoid damage of the cable 14 during passage through the aperture 100 in the guiding member 98, the cable 14 should be protected from being bent at the aperture 100. For this reason, a portion 101 of the cable 14 extending beyond the guiding member 98 maintained in alignment with the portion 99 of the cable 14 during movement of the manipulandum 11. This is provided by means of the coupling mechanism 40 which allows flexible attachment of the exercise module 12 to the framing structure 13, so that the exercise module 12 is free to accept any orientation in space during movement of the manipulandum 11, which keeps the portions 99 and 101 of the cable 14 in aligned mutual disposition.

Referring again to FIGS. 14 and 20, the module housing 50 includes two semi-spheres 102 and 103, which, being secured to each other, provide for protection of the elements inside the housing 50 and provides noise reduction. Each semi-sphere 102 and 103 has a peripheral rim 104 and 105, respectively provided with apertures 106. Once the semi-spheres are joined together with their rims 104 and 105 adjacent each other, and the apertures on the rim 104 are aligned with the same on the rim 105, fasteners 107 protrude through the aligned apertures 106, thus couping the semi-spheres 102 and 103. The semi-sphere 102 has side semi-cylinders 108 and 109, while the semi-sphere 103 has side semi-cylinders 110 and 111. Once the semi-spheres 102 and 103 are properly secured to each other, the semi-cylinders 108 and 110 form a cylinder having a longitudinal channel 112 for allowing the cabling (harnessing) 26 to pass through. The semi-cylinders 109 and 111, being put together, form a longitudinal channel 113.

As discussed above, the semi-sphere 103 is molded with the cavity 97 receiving the guide roll 55. The cavity 97 is defined as a semi-cylinder having the length equal to the length of the central axis of the internal cylinder 56 of the guide roll 55, such that the internal cylinder 56 fits into the cavity 97 in an immovable manner. The radius of the cavity 97 corresponds to the diameter of the outer cylinder 57 of the guiding roll 55 leaving a slight distance between the outer surface of the outer cylinder 57 and the internal surface of the cavity 97 which allows rotation of the outer cylinder 57 about the central axis thereof along with the displacing cable 14.

The semi-sphere 102 of the module housing 50 is provided with a universal joint 58 which allows smooth swiveling of the exercise module 12 as exercise routines are performed with the exercise system 10 of the present invention. Tension applied to the module 12 is sensed by the force sensor 27 secured to universal joint 58 by a bolt 127. Provided at the distal end of the universal joint 58, is the coupling mechanism 40 which is attached to the framing structure 13, as is shown in FIGS. 1A and 1B, or to any other reference surface at a predetermined position on a supporting structure customized to each particular situation where the exercise system of the present invention is used, as discussed in previous paragraphs.

In the particular embodiment illustrated herein, the supporting structure is the framing structure 13 which includes a square tubular box frame approximating the internal dimensions of space station. A seat track 59, best shown in FIGS. 1A, 1B, 17, 18, and 19 is securely attached to each square tubular member 60 of the framing structure 13. Each seat track 59 has a central longitudinally extending channel 61 contoured in such a way that to have a plurality of annular openings 62 that creates a combination of narrower and wider areas of the channel 61 of the seat track 59.

Figure 17:
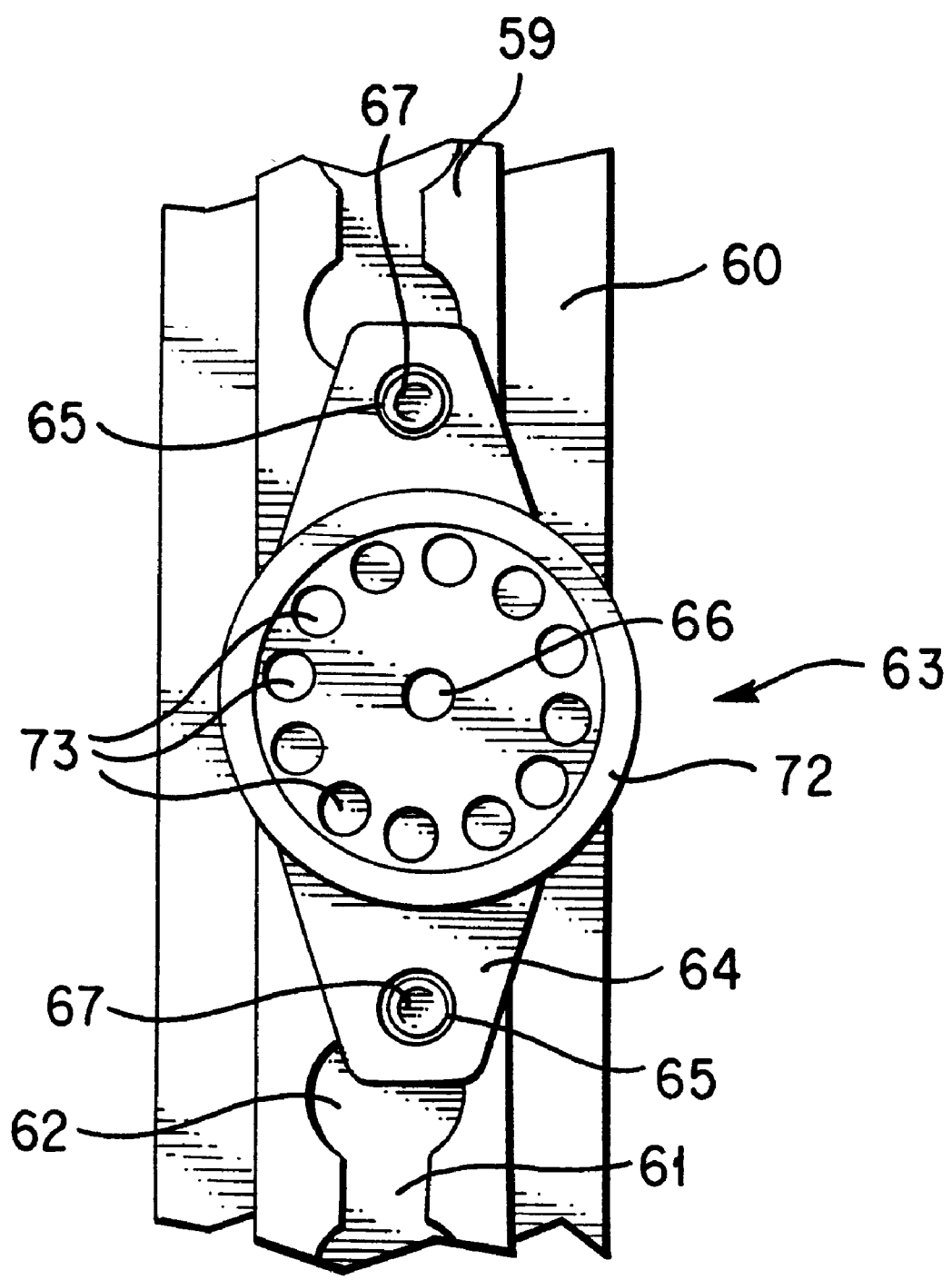
FIG. 17 is a front view of the seat track mounting fixture of the present invention.
Figure 18:
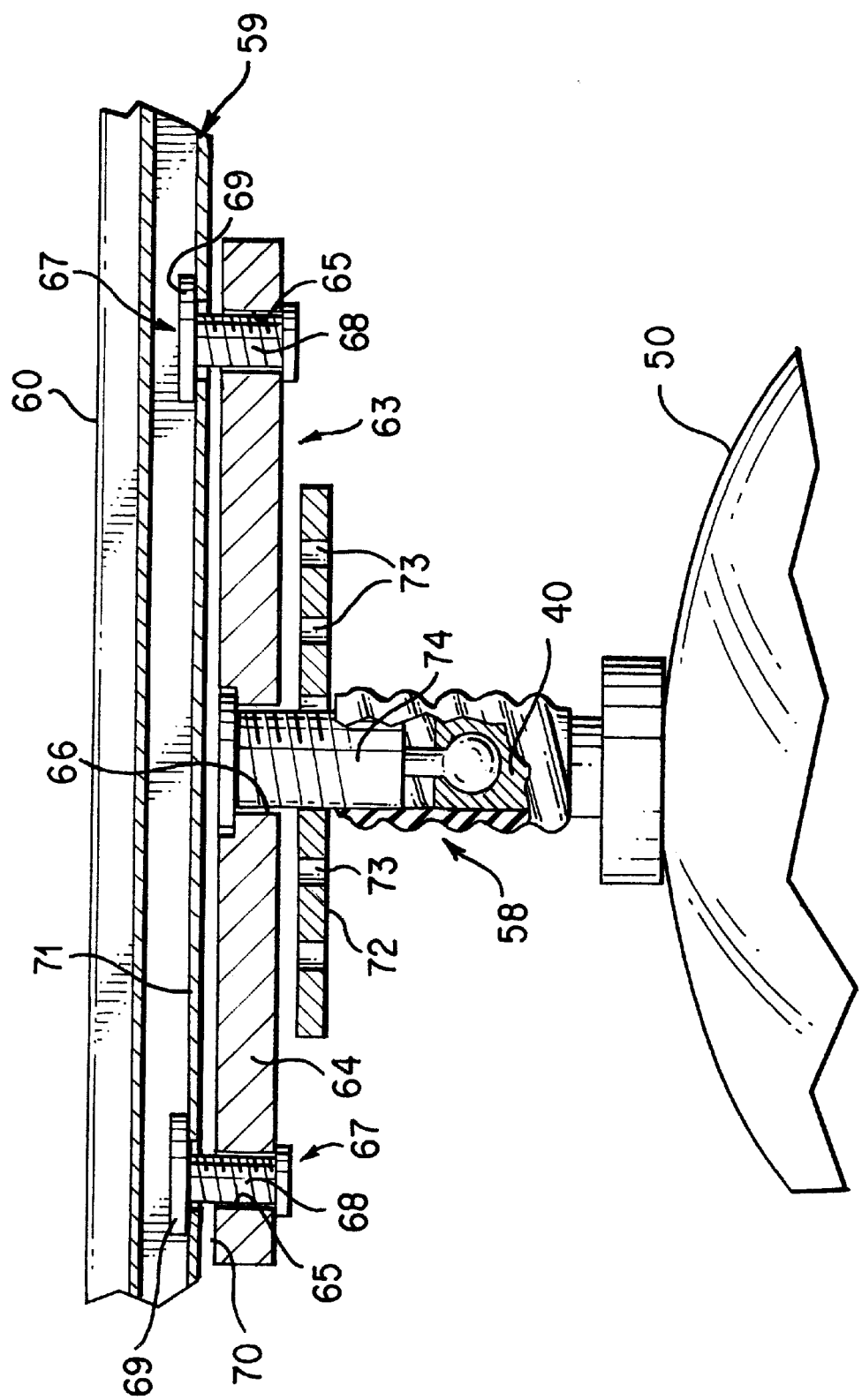
FIG. 18 is a cross-section of a coupling mechanism between the active module and the framing structure of the present invention.

A seat track mounting fixture 63, best shown in FIGS. 17 and 18, is provided for serving as a coupling interface between the coupling mechanism 40 of the active module 12 and the seat track 59.

The mounting fixture 63 includes a base member 64 having two side openings 65 and a central opening 66 (best shown in FIG. 18). Fastening members 67 extend through the side openings 65 of the base member 64. Each fastening member 67 has a threaded portion 68 and wider end portions 69.

The end portions 69 extend above the surface 70 of the base member 64 such that a front wall 71 of the seat track 59 may be locked between the surface 70 of the base member 64 and the end portion 69 of the threaded fastening member 67. As best shown in FIGS. 17 and 18, the mounting fixture 63, in order to be secured to the seat track 59, is positioned over the front wall 71 of the seat track 59, with the fastening members 67 locking the mounting fixture 63 to the seat track 59 by engaging the portions of the front wall 71 between the wider end portion 69 and the surface 70 of the base member 64 of the mounting fixture 63.

Existence of the wider and narrower portions of the central channel 61 of the seat track 59 makes it possible to easily and quickly secure the mounting fixture 63 to the seat track 59 by mere repositioning the mounting fixture 63 from one position on the seat track 59 to another.

A circular member 72 is secured to the base member 64 of the mounting fixture 63 in substantially parallel mutual arrangement with the base member 64. The circular member 72 has a plurality of apertures 73 disposed annularly along the perimeter of the circular member 72. Further, the circular member 72 has a bore member 74 secured within the central opening 66 of the base member 64.

As best shown in FIG. 18, the coupling mechanism 40, provided at an end of the universal joint 58 is threadingly engaged within the bore member 74 of the circular member 72, thereby coupling the module housing 50 to the seat track 59 through the mounting fixture 63. Thus, the arrangement including the seat track 59 and the mounting fixture 63 provides a quick and easy way of securing and/or moving the active module of the present invention to different positions when needed.

As best shown in FIG. 15, inside of the module housing 50, are received the following elements: the brushless DC motor 33 which extends coaxially with a PTO drum 75 which provides the interface between the motor 33 and a Harmonic Drive™ unit 76. The motor 33 is coupled to the drum element 51 of the reel 34 through the Harmonic Drive™ unit 76. The magnitude and direction of torque delivered to the drum element 51 by the DC motor 33, through the Harmonic Drive™ unit 76, corresponds to the DC drive current supplied to the motor 33. Thus, by controlling this drive current, the magnitude and direction of torque exerted by the reel 34 on the cable 14 can correspondingly be controlled. Stated otherwise, the tension forces exerted by the reel 34, particularly by the drum element 51 thereof on the cable 14 can be controlled through the motor 33 by correspondingly controlling the drive current supplied thereto.

The motor 33 and the Harmonic Drive™ unit 76, as well as the drum element 51, can be driven selectively in either a forward or a reverse rotative direction. With the foregoing capabilities, the motor 33 and the Harmonic Drive™ unit 76, as well as the reel 34, when appropriately controlled, establishes the tension force supplied by the active exercise module 12 to the cable 14, and further serves to retract the cable 14 from an extended position to its stored position on the drum element 51 within the module housing 50.

The Harmonic Drive™ unit 76 is a reduction gear mechanism well-known to those skilled in the art and was chosen for this particular application for its unique features, such as the reduction ratio approximately 60:1 to 200:1 and the amount of power which can be obtained from the Harmonic Drive™ unit 76. The Harmonic Drive™ unit 76 used in the subject invention, is produced by Teijin Seiki Boston, Inc., Peabody, Mass., and, as known to those skilled in the art, includes an elliptical non-rigid external gear, a round rigid internal gear, and an elliptical ball bearing assembly. At normal operating conditions this system allows momentary peak torques substantially higher than constant speed running torques. The Harmonic Drive™ unit provides for 90 pounds of pulling forces for each active exercise module 12 derived from the ¼ hp motor 33. The system is positioned between the motor 33 and the drum element 51, and these elements are kept together within the drum element 51 by means of a bearing cap 77 coupled to a rim 78 of the drum element 51 and the end cap 79 coupled to the drum element 51 at another end 80 thereof.

As shown in FIG. 15, the end cap 79 is coupled to the end 80 of the drum element 51 through a heat sink 81 provided for heat dissipation. A shaft 82 of the motor 33 is inserted into the PTO drum 75 which is received inside of the motor sleeve 83 with the bearing 84 positioned on the outer surface of the motor sleeve 83. The motor sleeve 83 is disposed coaxially within the harmonic unit 76. A fan plate 85 is secured to the unit 76 opposite to the end of the unit 76 receiving the motor sleeve 83. The bearing cap 77 joins together the fan plate 85, a driven side axle 86, and the bearing 87 together and is coupled to a face 88 of the unit 76 by means of a threaded securement. The end cap 89 is secured to the bearing cap 77 by threaded fasteners (not shown). The end 90 protrudes through the opening 91 of the heat sink 81 and through the opening 92 of the end cap 79 to allow freewheeling.

Figure 16:
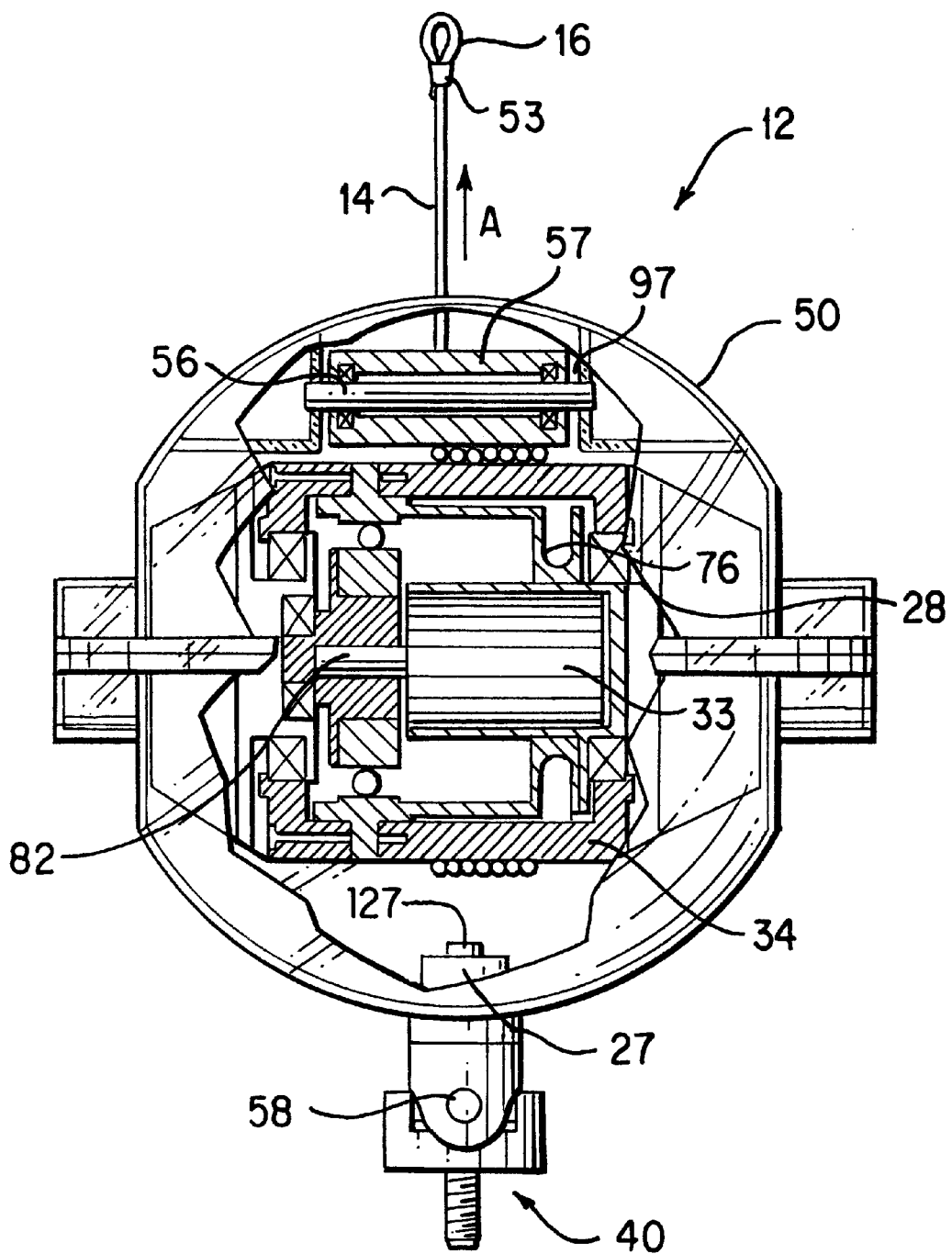
FIG. 16 is a longitudinal cross-section of the exercise module of the present invention.

The force sensor 27 discussed in previous paragraphs, and shown in FIG. 16, is mounted between the module housing 50 and the universal joint 58, and provides a continuously sensed signal indicative of a tension force exerted on the cable 14 when extended. The force sensor 27 is secured to the universal joint 58 by a bolt 127 extending axially into the universal joint structure. Extension or displacement of the cable 14 is in the direction of arrow A shown in FIG. 16 and occurs responsive to a pulling force exerted on the cable 14 in this direction by the user performing exercise routines. The force sensor 27 may be a load cell or other suitable force sensor well-known to those skilled in the art. The MMID embodiment described uses a separate force sensor to measure the tension in each cable of each exercise member. To make a low cost version of the MMID, that separate force sensor can be eliminated. This is done by having the computer monitor the current through the motor. Then using a mathematical model of the friction of the exercise module at various motor speeds, and a model of the motor torque as a function of motor current, the tension force on the cable can be estimated with enough accuracy for use in exercise equipment. Using this means, a separate force transducer is not required, albeit the resulting system will have less accuracy than is feasible using a separate force transducer.

The displacement sensor 28, also introduced in previous paragraphs, is coupled to the rotatable reel 34 in order to establish a sensed signal indicative of a length of the cable 14 extending from the housing 50 of the exercise module 12. The displacement sensor 28 may be, for example, a potentiometer/encoder assembly, for providing a continuous signal indicative of the cable extension. A motor which uses a Hall effect sensor for comutation can be used where the signals from the Hall effect sensor can be used asn an incremental encoder. In this case, no separate encoder is required. Because of the high gear ratio harmonic gear, sufficient resolution is still achieved. Associated with both the force sensor 27 and displacement sensor 28 are drive electronics such as an amplifier, required for conditioning the sensed signals and for delivering them through the signal communication link to the control structure 19, as shown in FIG. 5.

Therefore, the active exercise module 12 provides signals indicative of the extended length of, and tensional force exerted on the cable 14, and in turn, receives a control signal from the external computer, such as the control structure 19, for controlling the forces exerted by the motor 33 and the harmonic unit 76 on the rotating reel 34, as was discussed in previous paragraphs.

The cabling (or harnessing) 26 extends from the exercise module 12 through the channel 112 in the module housing 50 and further extends through an opening 95 provided in the tubular member 60 of the framing structure 13 to an auxiliary box 96 schematically shown in FIG. 19 to which the harnesses 26 from all exercise modules 12 are connected.

The auxiliary box 96 includes power supplies and motor drivers (not shown) for all exercise modules 12 used in the exercise system 10 of the present invention.

It is to be understood that a great emphasis has been placed on safety of operating and using the exercise system of the present invention. The safety structure as partially discussed in previous paragraphs includes:

(a) a means to de-energize the exercise system when the user releases his/her grip on the manipulandum 11, or releases pressure on any switches on the manipulandum, one for each hand. For exercises, where the manipulandum 11 is not held by the user (for instance, foot exercises), a separate releasing switch is held in one or both hands.

(b) a means to de-energize the exercise system of the present invention if the trajectory varies by more than a safety factor from the specified trajectory.

(c) a means to de-energize the exercise system in response to a voice command from the user.

(d) a means to set the maximum force on the manipulandum from any cable by setting switches which limit the maximum power to the motor, and by using an attachment which will break away at a specified force.

(e) a means to de-energize the exercise system if motion stops for more than a preset time.

(f) a means to place physical stops on each cable to prevent the cable from retracting beyond that point. This mechanically locks the system into a smaller work volume which is useful in specific cases.

All of the above safety features are independent of the software which controls the exercise system 10.

The system of the present invention is designed to operate on the 24–28 VDC current available on the space station with the estimated power consumption during exercise routines to be approximately 300–500 watts.

As it is clear from the above discussion, the exercise system of the present invention is a flexible system allowing for considerable degrees of freedom in specifying the desired operation of the system. These degrees of freedom range from the possibility of specifying customized exercise routines to the possibility of simulating currently non-existing exercises. The proposed system is also capable of simulating the presence of rails through which the virtual weight must move, as well as different effort profiles, for example, variable effort, which conventional weight machines cannot provide. The system is capable of a diagnostic procedure which tests a new user, prompts the new user to make certain actions and to give certain information about him/herself, as discussed in previous paragraphs, so that the exercise system can design a specific exercise routine for a particular user, taking into consideration his/her dimensions, weight, fitness level, etc.

The exercise system of the present invention being extremely flexible and easily re-arrangeable for different types of exercise routines, and also being capable of operating in gravity free environments, provides for unique centralized supervision of geographically distant exercise machines from a centralized location, even from a home office, and is easily adaptable for network competition when geographically distant users compete against each other supervised from a centralized control location. The exercise system as described in the present Patent Application, therefore, is not only unique in design thereof, but also provides a number of functions and applications in space, athletic, physical therapy, and entertainment fields not found in previous exercise systems.

What is claimed is:

1. A computerized exercise system, comprising:
   an exercise member,
   a reference base,
   at least one exercise module removably attached to said reference base,
   a reversibly displaceable cable means extending at one end thereof from said at least one exercise module and coupled at another end thereof to said exercise member,
   a displacement sensing unit within said at least one exercise module adapted to sense displacement of said cable means,
   force sensing means for measuring the total force applied to said cable means,
   a tension actuating unit within said at least one exercise module adapted to generate desired tension forces in said cable means,
   processor control means, including:
      means for monitoring said displacement sensing unit,
      means for monitoring said force sensing means,
      memory means for storing at least one exercise configuration represented by a predetermined data set of (1) resistive forces, (2) desired motion, and (3) combinations thereof, to be applied to said exercise member in correspondence to position parameters and to measured total forces on said exercise member,
      means for comparing, in real time, said monitored displacement of said cable means, said predetermined position parameters of said exercise member and said force values measured by said force sensors to determine the resistive forces thereof to be applied to said exercise member by said tension actuating unit, and tension planner means for translating said resistive forces into said desired tension forces to be exerted in said cable means by said tension actuating unit, thereby creating desired resistive forces at said exercise member at each position thereof in correspondence with said at least one exercise configuration.

2. The computerized exercise system of claim 1, further comprising:

a plurality of said exercise modules, said processor control means controlling said plurality of said exercise modules to interact each in coordination with the others.

3. The computerized exercise system of claim 1, wherein said at least one exercise module further includes a module housing, and rotatable reel means mounted within said module housing for reversibly winding said cable means thereon, said tension actuating unit being operatively coupled to said rotatable reel means to drive the same for generating said desired tension in said cable means.

4. The computerized exercise system of claim 3, wherein said tension actuating unit includes an electric motor operatively coupled to said tension planner means, and a harmonic drive unit coupled between said electric motor and said rotatable reel means.

5. The computerized exercise system of claim 3, wherein said tension actuating unit is adapted for rotatively displacing said rotatable reel means selectively in a forward and in a reverse direction.

6. The computerized exercise system of claim 3, further including force sensing means coupled to said rotatable reel means for establishing a signal responsive to a tension force in said cable.

7. The computerized exercise system of claim 6, wherein said force sensing means includes a load cell coupled between said rotatable reel means and said reference base.

8. The computerized exercise system of claim 3, wherein said module housing is attached to said reference base through a flexible coupling.

9. The computerized exercise system of claim 1, wherein said processor control means further includes an input unit for entering a plurality of predetermined exercise configurations.

10. The computerized exercise system of claim 9, wherein said predetermined exercise configurations are entered into said input unit from a location remote from said processor control means through a communication link.

11. The computerized system of claim 10, wherein said communication link includes a digital network.

12. The computerized exercise system of claim 9, wherein each of said predetermined exercise configurations includes parameters specifying a desired exercise routine, desired system behavior and parameters specific to a user of said system.

13. The computerized exercise system of claim 9, further including a configuration logic unit coupled to said input unit, said configuration logic unit verifying whether a selected one of said exercise configurations is achievable and corresponds to safety requirements.

14. The computerized exercise system of claim 13 wherein said memory means is coupled to said configuration logic unit, parameters of said selected exercise configuration being fed into said memory means upon approval of said configuration logic unit.

15. The computerized exercise system of claim 14, wherein said tension planner means is coupled to said memory means to receive said force equations, trajectory data, and other data therefrom.

16. The computerized exercise system of claim 15, further including an optimization routine block coupled to said tension planner means, said optimization routine block being adapted to find an optimal set of tension forces for said cable means, data representative of said tension forces being transmitted from said tension planner means to said optimization routine block, and data representative of said optimal set of tension forces being transmitted from said optimization routine block to said tension planner means.

17. The computerized exercise system of claim 16, further including a repetition logic/look-up table/interpolation unit coupled to said tension planner means, said repetition logic/look-up table/interpolator unit being adapted to control initiation, operation and conclusion of said selected exercise routine.

18. The computerized exercise system of claim 17, further including dynamic controller means and force sensing means operatively coupled to said at least one exercise module to sense in real time actual tension forces in said cable means, said dynamic controller means being coupled to said repetition logic/look-up table/interpolator unit to receive data representative of desired tension forces in said cable means, exercise trajectory, and other exercise parameters therefrom, said dynamic controller means being further functionally coupled to said force sensing and position sensing means to receive said actual tension forces therefrom and to said tension actuating unit to receive information representative of a state of said tension actuating unit, said dynamic controller means controlling said tension actuating unit to generate said desired tension force in said cable means, to achieve the desired forces and the desired trajectory.

19. The computerized exercise system of claim 18, further including a length-to-position conversion unit coupled to said tension actuating unit, said length-to-position conversion unit receiving from said tension actuating unit first data representative of the length of said cable means attached to said exercise member, converting said first data into second data representative of position of said exercise member, and transmitting said second data to said repetition logic look-up table/interpolator unit.

20. A computerized exercise system comprising:

at least one exercise module;

a manipulandum;

a displaceable cable extending between said at least one exercise module and said manipulandum; and processor control means;

said at least one exercise module including:
a reel adapted to wind said cable means thereon,
a DC motor, and
a Harmonic Drive unit mated to said DC motor and coupled between said DC motor and said reel;
said processor control means controlling said DC motor to rotate said reel, thereby controlling displacement of said cable means, thus exerting a desired tension force in said cable means, and thereby applying a desired resistive force to said manipulandum through said cable means.

21. A method of exercising, comprising the steps of:

providing an exercise member, providing at least one exercise module, providing a reference base, removably attaching said at least one exercise module to said reference base at a predetermined location thereat, extending displaceable cable means from said at least one exercise module and coupling a rear end thereof to said exercise member, monitoring actual displacements of said cable means, monitoring actual tension forces in said cable means, providing processor control means, storing in said processor control means at least one predetermined exercise configuration data set, said data set including parameters corresponding to positions of said exercise member and parameters corresponding to resistive forces to be applied to said exercise member at said positions thereof, in real time comparing said actual displacements of said cable means with said positions of said exercise member, and generating a signal representative of a desired resistive force to be applied to said exercise member at the position thereof corresponding to said actual displacement of said cable means, translating said desired resistive force to be applied to said exercise member into a desired tension force to be exerted in said cable means, and, displacing said cable means by means of said at least one exercise module in a direction and at a displacement distance determined in a real time by said processor control means to exert said desired tension force in said cable means.

22. The method of claim 21, further including the steps of:

entering into said processor control means information concerning a particular user, and adjusting said at least one predetermined exercise configuration data set to said particular user.

* * * * *

UNITED STATES PATENT AND TRADEMARK OFFICE
CERTIFICATE OF CORRECTION

PATENT NO.    : 6,280,361 B1                                     Page 1 of 1
DATED         : August 28, 2001
INVENTOR(S)   : William B. Harvey, Leonard S. Hanes, Benjamine Bachrach It is certified that error appears in the above-identified patent and that said Letters Patent is hereby corrected as shown below:

<u>Title page,</u>
Filing date should be corrected as follows:
-- February 3, 2000 --.

Signed and Sealed this

Twenty-sixth Day of February, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO. : 6,280,361 B1
DATED : February 3, 2000
INVENTOR(S) : Benjamin Bachrach, William Harvey and Leonard Haynes It is certified that error appears in the above-identified patent and that said Letters Patent is hereby corrected as shown below:

Title page,
Item [*] Notice, should read as follows:
-- This invention was made with Government support under Contract No. NAS9-98036 awarded by NASA.
The Government has certain rights in the invention. --

Signed and Sealed this

Eighth Day of June, 2004

JON W. DUDAS
*Acting Director of the United States Patent and Trademark Office*